US012369726B2

(12) United States Patent
Hartenstine et al.

(10) Patent No.: US 12,369,726 B2
(45) Date of Patent: Jul. 29, 2025

(54) ADJUSTABLE INFANT SEAT

(71) Applicant: WONDERLAND SWITZERLAND AG, Steinhausen (CH)

(72) Inventors: Zachary C. Hartenstine, Birdsboro, PA (US); Nathanael Saint, Morgantown, PA (US); Anna R. Carter, Morgantown, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 190 days.

(21) Appl. No.: 18/030,365

(22) PCT Filed: Sep. 22, 2021

(86) PCT No.: PCT/US2021/051486
§ 371 (c)(1),
(2) Date: Apr. 5, 2023

(87) PCT Pub. No.: WO2022/081317
PCT Pub. Date: Apr. 21, 2022

(65) Prior Publication Data
US 2023/0371710 A1   Nov. 23, 2023

Related U.S. Application Data

(60) Provisional application No. 63/090,455, filed on Oct. 12, 2020.

(51) Int. Cl.
*B60N 2/22*   (2006.01)
*A47D 1/00*   (2006.01)
*B60N 2/26*   (2006.01)
*B60N 2/28*   (2006.01)

(52) U.S. Cl.
CPC ............... *A47D 1/002* (2013.01); *B60N 2/22* (2013.01); *B60N 2/224* (2013.01); *B60N 2/28* (2013.01)

(58) Field of Classification Search
CPC . B60N 2/22; B60N 2/224; B60N 2/28; A47D 1/002
USPC .......... 297/118, 250.1, 256.1, 284.9, 354.12, 297/354.1, 354.13, 356, 357, 452.25, 297/452.34
See application file for complete search history.

(56) References Cited

U.S. PATENT DOCUMENTS

| 2,171,251 | A |   | 8/1939 | Capron |   |
|---|---|---|---|---|---|
| 2,571,463 | A |   | 10/1951 | Lorenz |   |
| 3,142,512 | A | * | 7/1964 | Hamilton | A47D 1/002 297/317 X |
| 3,252,734 | A | * | 5/1966 | Berlin | A47C 17/1753 297/322 X |

(Continued)

FOREIGN PATENT DOCUMENTS

GB    2081575 A  *  2/1982 ............. A47D 1/002

OTHER PUBLICATIONS

International Search Report and Written Opinion for PCT/US2021/051486 dated Feb. 4, 2022.

*Primary Examiner* — Rodney B White
(74) *Attorney, Agent, or Firm* — Volpe Koenig

(57) ABSTRACT

An adjustable infant seat assembly is disclosed herein that includes various adjustment assemblies for providing variable angular orientations of multiple aspects of the adjustable infant seat assembly. The adjustable infant seat assembly also includes a removable soft goods assembly.

33 Claims, 14 Drawing Sheets

(56) References Cited

U.S. PATENT DOCUMENTS

| | | | | |
|---|---|---|---|---|
| 3,404,917 | A * | 10/1968 | Smith | B60N 2/2878 |
| | | | | 297/256.1 X |
| 4,274,674 | A * | 6/1981 | Deloustal | B60N 2/286 |
| | | | | 297/363 |
| 4,762,364 | A * | 8/1988 | Young | B60N 2/2878 |
| | | | | 297/130 |
| 4,998,307 | A * | 3/1991 | Cone | B60N 2/2863 |
| | | | | 297/256.13 |
| 5,092,004 | A * | 3/1992 | Cone | B60N 2/2845 |
| | | | | 297/118 |
| 5,496,092 | A * | 3/1996 | Williams | B60N 2/2812 |
| | | | | 297/354.13 X |
| 5,524,964 | A * | 6/1996 | Weimersheimer | B60N 2/2821 |
| | | | | 297/354.13 X |
| 5,681,084 | A * | 10/1997 | Yoneda | A47D 1/002 |
| | | | | 297/354.13 X |
| 5,810,436 | A * | 9/1998 | Surot | B60N 2/2821 |
| | | | | 297/284.9 X |
| 5,845,967 | A * | 12/1998 | Kane | B60N 2/286 |
| | | | | 297/250.1 X |
| 5,860,695 | A * | 1/1999 | Espenshade | B62B 7/123 |
| | | | | 297/354.12 X |
| 6,196,629 | B1 * | 3/2001 | Onishi | B60N 2/2869 |
| | | | | 297/354.13 X |
| 6,485,101 | B2 * | 11/2002 | Kassai | B60N 2/2851 |
| | | | | 297/284.9 X |
| 6,623,074 | B2 * | 9/2003 | Asbach | B60N 2/2851 |
| | | | | 297/284.9 X |
| 6,679,552 | B1 * | 1/2004 | Kassai | B60N 2/286 |
| | | | | 297/250.1 |
| 7,350,253 | B2 | 4/2008 | Simon | |
| 7,364,235 | B2 * | 4/2008 | Chen | A47D 1/002 |
| | | | | 297/354.12 X |
| 7,625,043 | B2 * | 12/2009 | Hartenstine | B60N 2/286 |
| | | | | 297/250.1 X |
| 7,823,974 | B2 * | 11/2010 | Mendenhall | B60N 2/75 |
| | | | | 297/354.13 X |
| 9,629,476 | B1 * | 4/2017 | Robbins | A47D 9/02 |
| 9,661,936 | B2 * | 5/2017 | Lin | A47D 11/005 |
| 9,975,457 | B2 * | 5/2018 | Chen | B60N 2/2227 |
| 10,857,917 | B1 * | 12/2020 | Edwards | B60N 2/2878 |
| 2004/0245826 | A1 * | 12/2004 | Jane Santamaria | B60N 2/2851 |
| | | | | 297/284.9 |
| 2009/0007336 | A1 | 1/2009 | Kassai et al. | |
| 2012/0226202 | A1 | 9/2012 | Wright et al. | |
| 2012/0235450 | A1 | 9/2012 | Oren et al. | |
| 2016/0113412 | A1 | 4/2016 | Clark | |

* cited by examiner

ADJUSTABLE INFANT SEAT

CROSS-REFERENCE TO RELATED APPLICATIONS

This application is a National Stage 371 of International Patent Application No. PCT/US2021/051486, filed on Sep. 22, 2021, which claims priority to U.S. Provisional Patent Application No. 63/090,455, filed on Oct. 12, 2020, the disclosures of which are hereby incorporated by reference as if set forth in their entirety herein.

TECHNICAL FIELD

The present disclosure generally relates to a seat that is configured to support an infant or child. More specifically, this disclosure relates to an infant seat that can be adjusted to provide an optimal level of incline or recline for a child's comfort and health.

BACKGROUND

Infant seats are well known for securely supporting an infant in a specific seated position or supine position. Known infant seats often lack the ability to adjust the incline of either the upper body support surface (i.e. seat back) or the lower body support surface (i.e. seat bottom). Caregivers often have to manually adjust the angle of inclination of their infants in these infant seats by propping pillows or other supports under or around the infant in order to provide optimal comfort for the infant. As infants mature and grow, their desired reclining positions also generally change. Furthermore, it is often desirable to support an infant in a semi-upright position after feeding in order to aid digestion. Adjusting the relative angle or inclination of portions of an infant seat is therefore highly desirable for multiple reasons.

Infant seats generally support an infant at a predetermined height above a ground surface. Therefore, it is important to ensure that the infant is secured in the seat such that the infant cannot inadvertently fall out of the seat. Some infant seats include side restraints in order to physically limit the ability for an infant to roll out of the infant seat. However, known infant seats typically do not provide the ability to adjust the location or angle of these side restraints relative to the upper body support surface or the lower body support surface.

SUMMARY

The present disclosure is directed to an adjustable infant seat assembly that provides multiple adjustment features for varying angles of at least one part of the infant seat relative to another. In one aspect, the assembly also provides an improved restraint system via lateral containment supports.

In one aspect, an adjustable infant seat assembly is provided that includes a first seat portion configured to support an infant's upper body, a second seat portion configured to support an infant's lower body, a junction defined between the first seat portion and the second seat portion that provides a pivot connection for the first seat portion and the second seat portion, and a plurality of lateral containment supports that are each arranged on a respective lateral side of either the first seat portion or the second seat portion. An angular orientation is configured to be adjustable for at least one of: the first seat portion, the second seat portion, or the plurality of lateral containment supports.

A method of adjusting an angle of different portions of an adjustable infant seat assembly is also disclosed herein.

Additional embodiments are described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
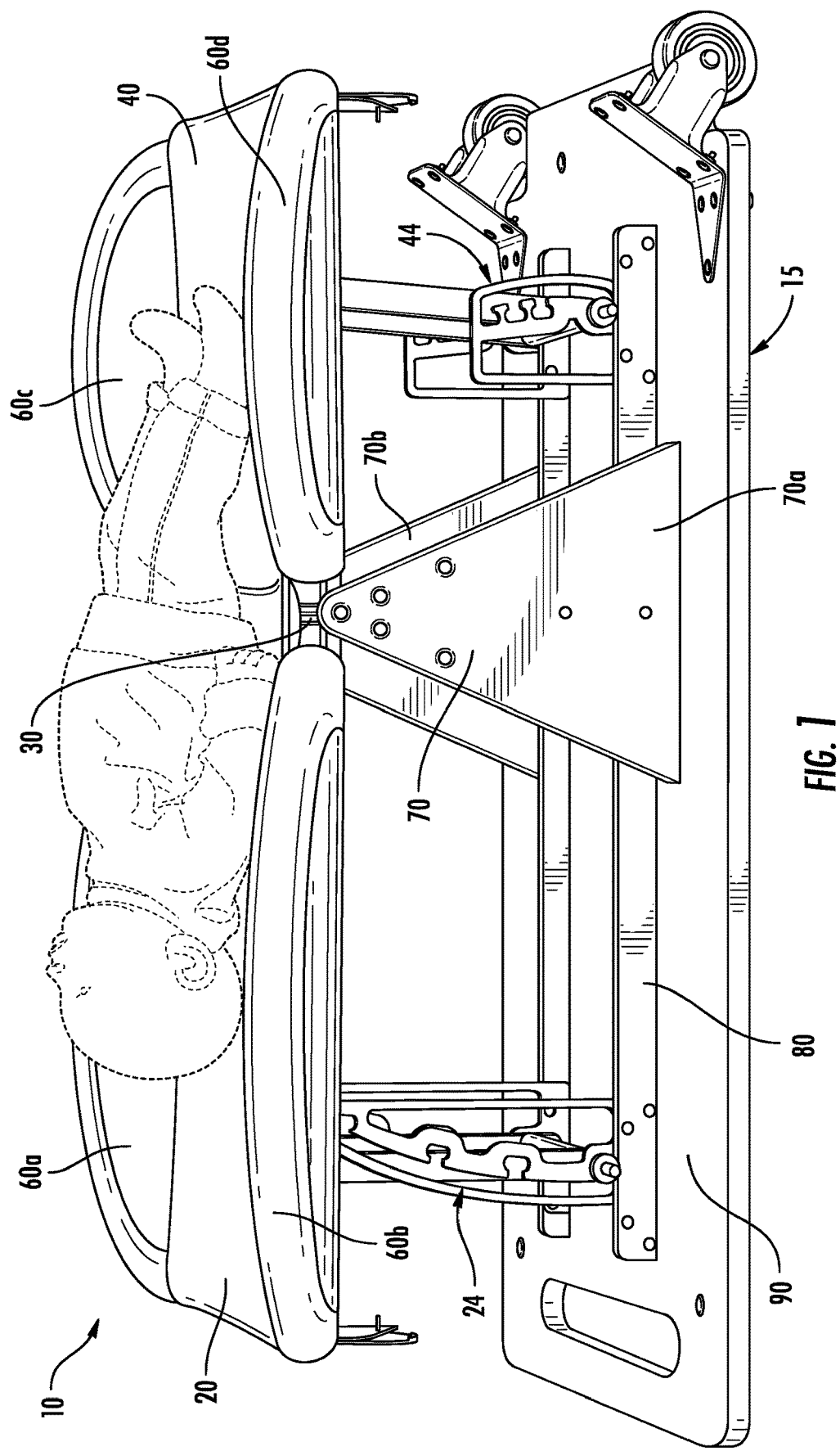
FIG. 1 is a side view of an adjustable infant seat assembly according to one aspect.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import.

Figure 2:
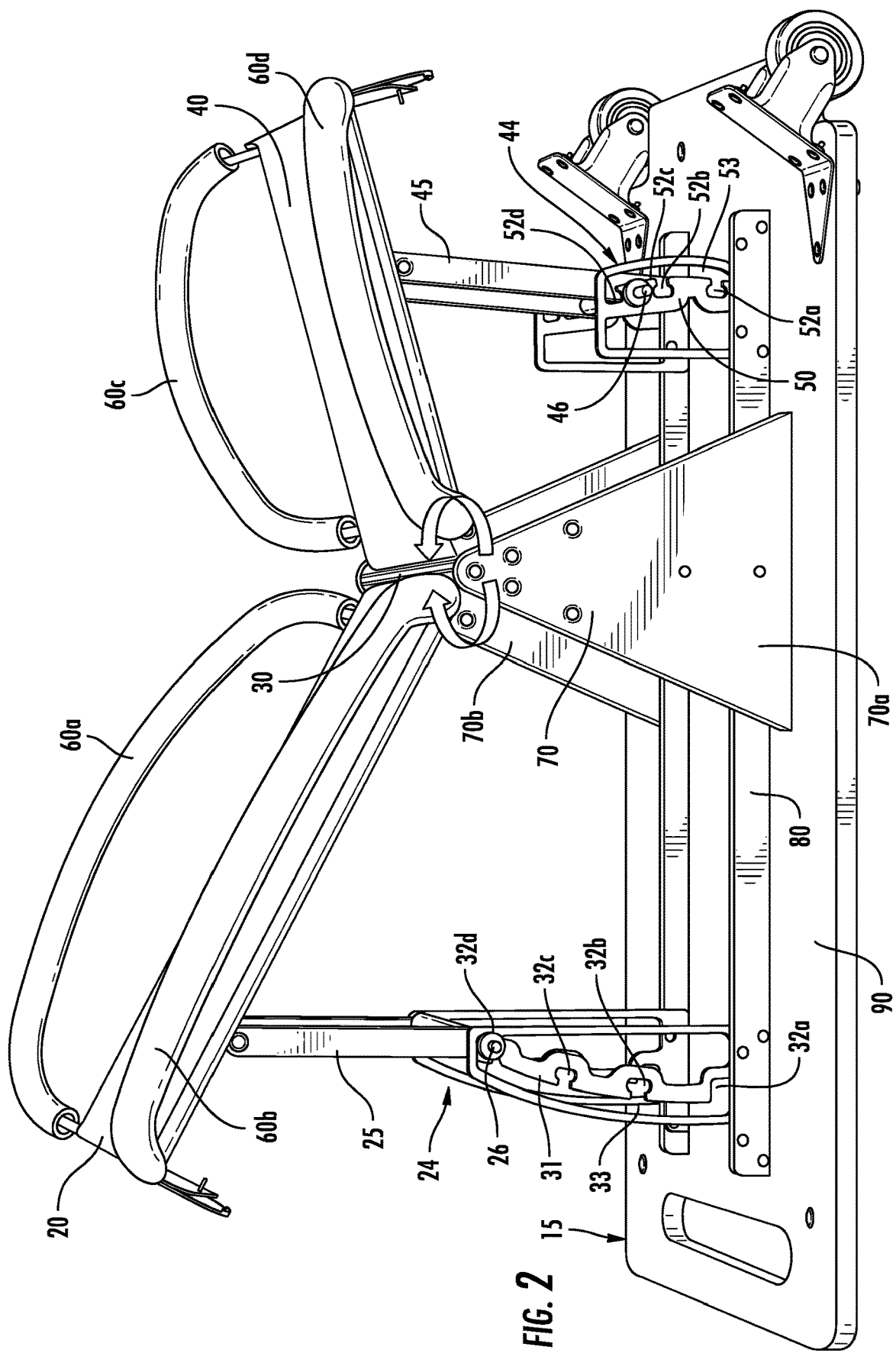
FIG. 2 is another side view of the adjustable infant seat assembly in an inclined state.

As shown in FIGS. 1 and 2, an adjustable infant seat assembly 10 is generally disclosed. The adjustable infant seat assembly 10 preferably includes a first seat portion 20 and a second seat portion 40 that can be angularly adjusted relative to each other. In one aspect, the first seat portion 20 is a seat back or upper body support surface, and the second seat portion 40 is a seat bottom or lower body support surface.

According to various examples, a seat assembly according to this disclosure comprises a first seat portion 20, a second seat portion 40, and support structure 15 that supports the first seat portion 20 and the second seat portion 40. The first seat portion 20 and the second seat portion 40 are each configured to be angularly adjusted relative to the support structure 15. The support structure 15 can be any suitable support structure, and examples of some such support structures are discussed below. The first seat portion 20 and the second seat portion 40 can be configured to be angularly adjusted independently of one another. For example, the first seat portion 20 can be configured to be angularly adjusted, while the second seat portion 40 remains stationary or while the second seat portion 40 is angularly adjusted by an amount and/or direction that is different from that of the first seat portion 20. Similarly, the second seat portion 40 can be configured to be angularly adjusted, while the first seat portion 20 remains stationary or while the first seat portion 20 is angularly adjusted by an amount and/or direction that is different from that of the second seat portion 40. Thus, the seat assembly 10 can be configured such that the angular adjustment of each of the first seat portion 20 and the second seat portion 40 does not cause angular adjustment of the other of the first seat portion 20 and the second seat portion 40.

As shown in FIG. 2, the first seat portion 20 and the second seat portion 40 are angularly adjusted relative to each other. One of skill in the art will recognize that other seat portions can be included within the scope of the infant seat assembly 10 disclosed herein including, without limitation, a head portion or headrest and a foot portion or footrest. In one example, the first and second seat portions 20, 40 can have an adjustable feature that allows the first and second seat portions 20, 40 to be adjusted to be larger or smaller, such as a telescoping extension portion.

The first seat portion 20 and the second seat portion 40 are made of a material that provides support to an occupant, such as an infant or child. In one aspect, the first seat portion 20 and the second seat portion 40 are laterally flat. One of ordinary skill in the art would understand based on this disclosure that the seat portions 20, 40 could be formed from multiple materials, including a rigid frame or body, as well as soft goods cushions that are flexible to support the child comfortably. The first seat portion 20 and the second seat portion 40 can have some flexibility while still maintaining a support surface for an occupant. One of ordinary skill in the art would understand that the shape of the first seat portion 20 and the second seat portion 40 can vary, and the first seat portion 20 and the second seat portion 40 could include a concave surface. In one example, the first seat portion 20 and the second seat portion 40 are preferably composed of a rigid material such as wood, including plywood or wood composite. In another example, the first seat portion 20 and the second seat portion 40 are formed from plastic. One of ordinary skill in the art would understand that the first seat portion 20 and the second seat portion 40 can be formed from plastic, wood, or any other suitable material that provides support for an occupant. Pads or other soft components can be attached to the first seat portion 20 and second seat portion 40. In another example, padding or cushions can be integrally formed with a frame or body of the first and second seat portion 20, 40. Although the first and second seat portions 20, 40 are illustrated as solid components in the Figures, one of ordinary skill in the art would understand that the first and second seat portions 20, 40 could be formed as frames, such as stiffened wire supports. One of ordinary skill in the art would understand that the exact size, shape, profile, and general composition of the first and second seat portions 20, 40 can vary.

As shown in FIGS. 1 and 2, a junction 30 can be provided at an interface between the first seat portion 20 and the second seat portion 40. The junction 30 can be disposed at a seat bight of the seat assembly 10. The junction 30 can provide at least one pivot connection for the first seat portion 20 and the second seat portion 40. For instance, the junction 30 can provide a pivot connection for both the first seat portion 20 and the second seat portion 40, such that the first seat portion 20 and the second seat portion 40 are angularly adjustable relative to the junction 30. In an alternative example, the junction 30 can include two separate and distinct pivot connections for the first and second seat portions 20, 40. In one example, the junction 30 can include a pin or axle that extends through openings defined in each of the first seat portion 20 and the second seat portion 40. In one example, the first and second seat portions 20, 40 each define openings near the junction 30 and a sliding member is inserted inside of those openings to link the first and second seat portions 20, 40. One of ordinary skill in the art would understand that various types of pivoting connections can be provided between the junction 30 and both the first seat portion 20 and the second seat portion 40.

In one example, the first seat portion 20 and the second seat portion 40 may be defined as a single continuous surface instead of having a break or interruption at the junction 30. In this configuration, the single continuous support surface may be flexible in the region of the junction 30 such that the first seat portion 20 and the second seat portion 40 are adjustable relative to each other.

The support structure 15 of the seat assembly 10 can include a center support 70. In some examples, the support structure 15 can also include a base 90 and/or a frame 80. The center support 70 can be configured to support the junction 30. In one example, the center support 70 can provide a slot or opening through which an axle or pin of the junction 30 extends. As shown in some of the Figures, the support 70 can provide some elevation in height relative to a ground or support surface. One of ordinary skill in the art would understand that the height of the support 70 can be adjusted. Additionally, the height of the support 70 can vary between one example and another.

As shown in FIGS. 1 and 2, the center support 70 can include a pair of posts 70*a*, 70*b* connected to a support element, such as a base 90, in one aspect. The posts 70*a*, 70*b* can include a tapered profile such as a triangular profile, in one aspect. In another example, the center support 70 can include a single support that projects upwards from the base 90. In one aspect, the center support 70 can be formed integrally with the base 90. The center support 70 can provide a fixed height and rigid support for both the first seat portion 20 and the second seat portion 40 while allowing for free rotation relative to the junction 30. One of ordinary skill in the art would recognize that the center support 70 could be modified such that it provides a height adjustment feature.

In one aspect, a frame 80 can be provided that may be attached to the base 90. The frame 80 can define supports for at least a portion of a first adjustment assembly 24, at least a portion of the center support 70, and/or at least a portion of a second adjustment assembly 44. The frame 80 can be formed as a bracket, in one aspect.

In an alternative example, the base 90 can be omitted. In this example, the frame 80 may be provided but the frame 80 is not attached to any base element. The center support 70 or the frame 80 can be supported by another element instead of the base 90. For example, the center support 70 or the frame 80 can be supported by a lateral support. In another example, the support structure 15 can include receptacles or other types of connections that are configured to engage with bayonets or other connection elements on a stroller frame, high chair frame, bassinet frame car seat base, crib frame, or other type of frame. Accordingly, the assembly 10 can be configured to function as a car seat, crib sleeping surface, bassinet support surface, stroller seat, etc.

As shown in FIGS. 1 and 2, in some examples, the seat assembly 10 can comprise a plurality of lateral containment supports 60a, 60b, 60c, 60d. Each lateral containment support 60a, 60b, 60c, and 60d can be configured to be independently angularly adjusted relative to either the first seat portion 20 or the second seat portion 40 in order to provide lateral or side supports to ensure that an infant is maintained within the assembly 10. The plurality of lateral containment supports can comprise a first pair of the lateral containment supports 60a, 60b connected to the first seat portion 20, and/or a second pair of the lateral containment supports 60c, 60d are connected to the second seat portion 40. In one aspect, the lateral containment supports 60a, 60b, 60c, 60d can include a tube or frame. As shown in FIG. 2, the lateral containment supports 60a, 60b, 60c, 60d may include a generally curved tube or frame. A foam cushion may be provided around the tube or frame of the lateral containment supports 60a, 60b, 60c, 60d. In another example, the lateral containment supports 60a, 60b, 60c, 60d may be formed as solid flaps or panels. One of ordinary skill in the art would understand that the exact form, profile, shape, or configuration of the lateral containment supports 60a, 60b, 60c, 60d can vary. Although four lateral containment supports are illustrated in the drawings, one of ordinary skill in the art would understand that the quantity can vary.

Figure 3:
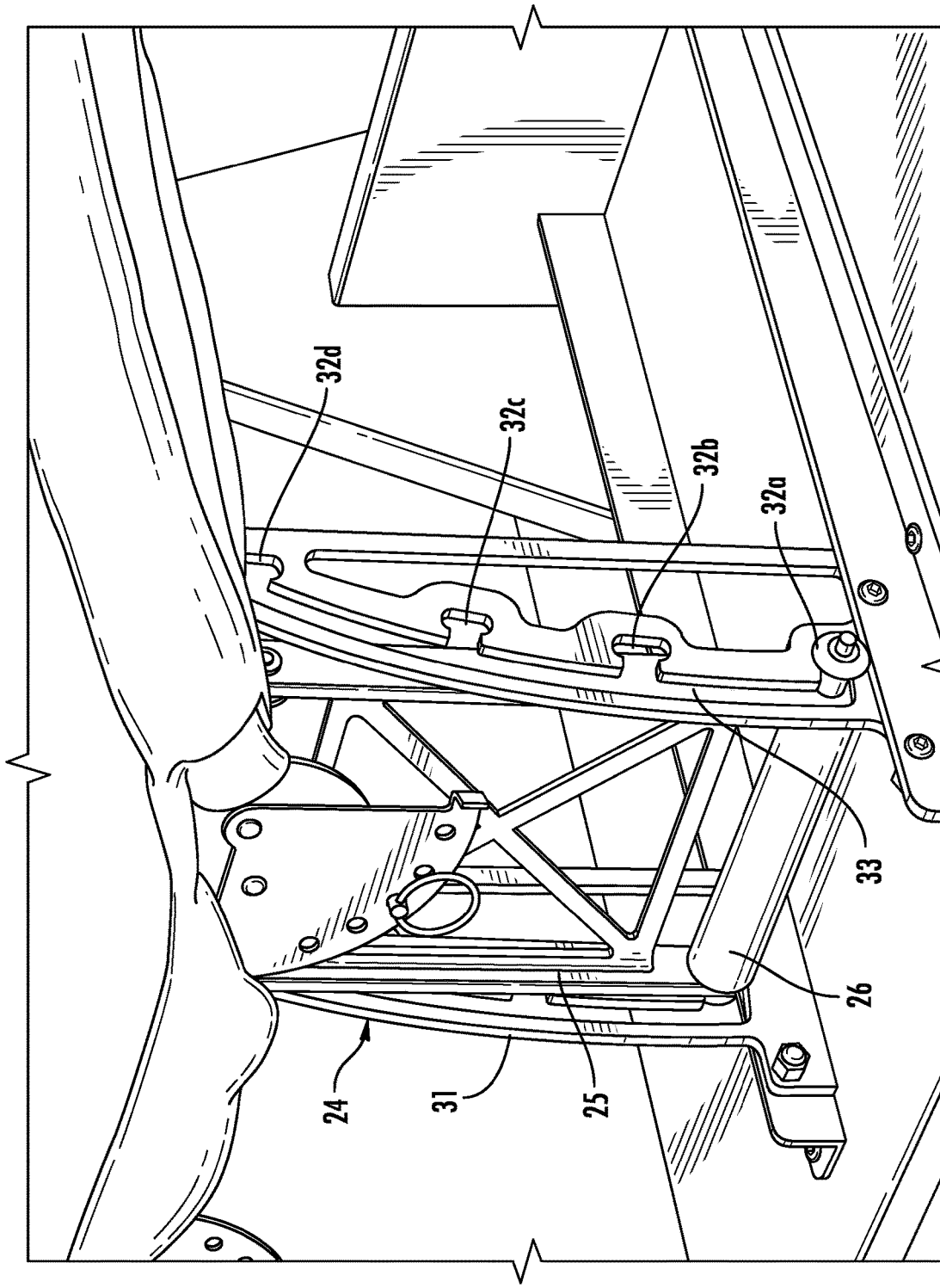
FIG. 3 is a perspective view of a first adjustment assembly for the adjustable infant seat assembly according to one example.
Figure 4C:
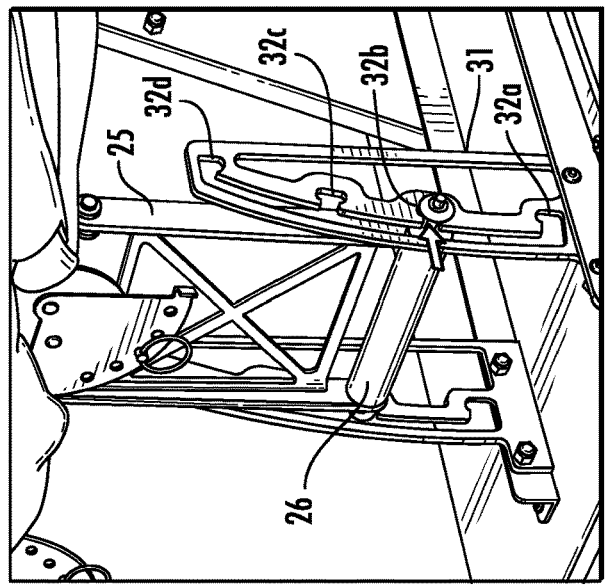
FIGS. 4A-4C are perspective views of the first adjustment assembly of FIG. 3 in various states.
Figure 4B:
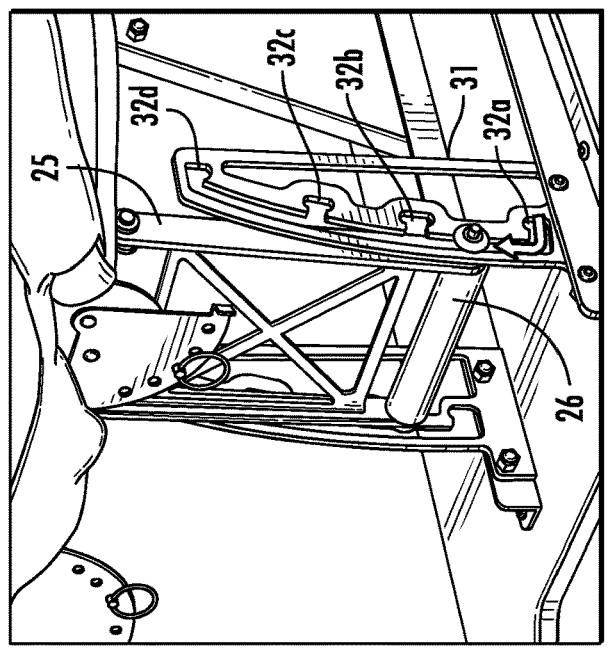
Figure 4A:
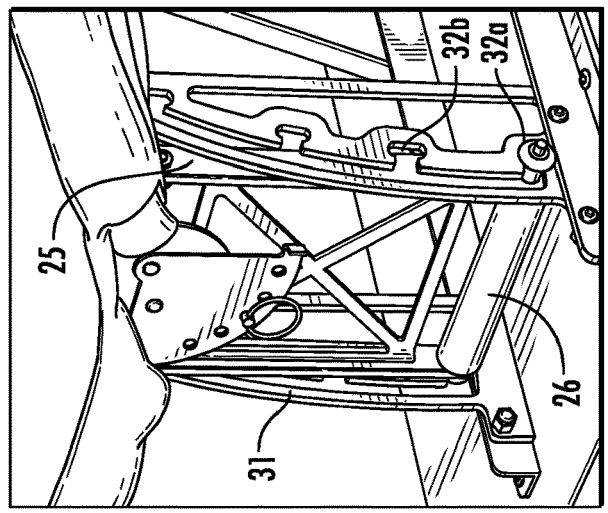

The seat assembly 10 can comprise a first adjustment assembly 24 that is configured to adjust an angle of the first seat portion 20 relative to the junction 30. The first adjustment assembly 24 can be configured in any suitable manner to enable adjustment of the angle of the first seat portion 20, and some examples of a first adjustment assembly are discussed below. As shown in more detail in FIG. 3, in one aspect, the first adjustment assembly 24 can comprise a first support 25 connected to the first seat portion 20, a first pin 26 attached to the first support 25, and a first plurality of adjustment openings 32a, 32b, 32c, 32d formed in a first base support 31 that is attached to the base 90. In one aspect, the first support 25 can be a frame structure that is pivotally attached to an underside of the first seat portion 20. The first base support 31 can include a frame structure that can be rigidly attached to the frame 80 and/or the base 90. In one aspect, the first base support 31 defines a first enclosed track 33 that constrains movement of the first pin 26 to a first predetermined area. An incline angle of the first seat portion 20 can be adjusted by removing the first pin 26 from a first one of the first plurality of adjustment openings 32a, 32b, 32c, 32d and manually raising or lowering the first pin 26 to a different, second one of the first plurality of adjustment openings 32a, 32b, 32c, 32d. Adjustment of the first adjustment assembly 24 is shown in more detail in FIGS. 4A-4C.

In one aspect, the first support 25 can be biased in a generally inboard or inward direction such that the first support 25 generally is urged towards the adjustment openings 32a, 32b, 32c, 32d. A spring or other biasing element can be arranged on an underside of the first seat portion 20 to bias the first support 25.

In an alternative example, the first adjustment assembly 24 can be modified such that the first pin 26 is formed with the first base support 31, and the adjustment openings 32a, 32b, 32c, 32d are formed on the first support 25. One of ordinary skill in the art would understand that the first adjustment assembly 24 may include varying types of interfaces or configurations that generally provide incremental or variable adjustment. Such examples of other configurations are generally shown in FIGS. 9A-14B.

In one aspect, the first plurality of adjustment openings 32a, 32b, 32c, 32d for the first seat portion 20 provide incline angles of 0°, 8°-12°, 16°-20°, and 26°-30°, respectively. In one aspect, the first plurality of adjustment openings 32a, 32b, 32c, 32d for the first seat portion 20 provide incline angles of 0°, 10°, 18°, and 28°, respectively. One of ordinary skill in the art would recognize based on this disclosure that the seat assembly 10 can be configured such that the first seat portion 20 is adjustable to any intermediate angle (i.e. greater than 0° and less than 30°) relative to the junction 30. For instance, the seat assembly 10 can be configured such that the spacing of the adjustment openings 32a, 32b, 32c, 32d is set at evenly spaced intervals in one example. In another example, the seat assembly 10 can be configured such that the spacing between the adjustment openings 32a, 32b, 32c, 32d is set at varying intervals. Additionally, one of ordinary skill in the art would understand that in another example the first seat portion 20 can be variably adjustable to any angle between a minimum angle (such as 0°) and a maximum angle (such as 30°).

Figure 5A:
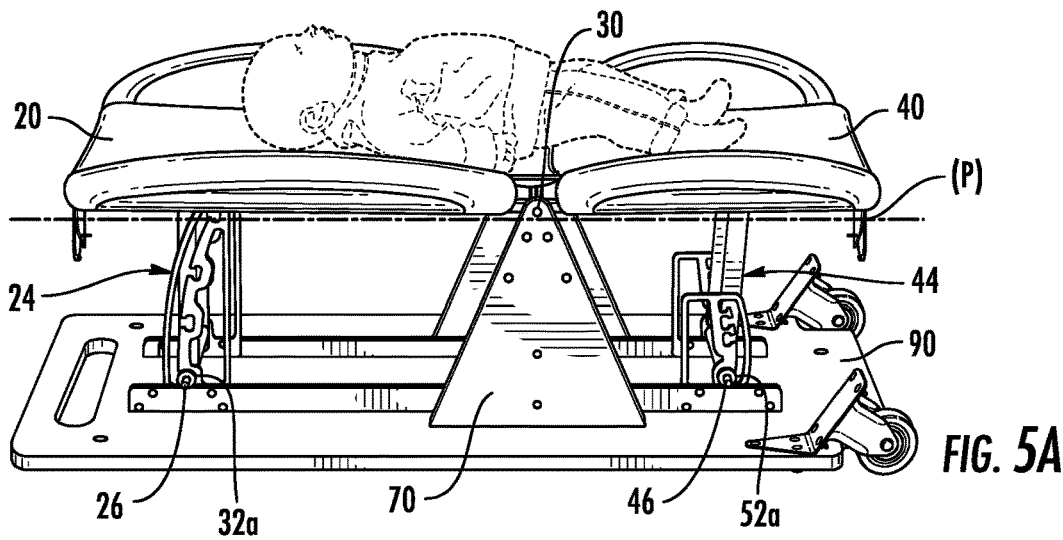
FIGS. 5A-5C are side views of the adjustable infant seat assembly in a variety of inclined states.
Figure 5B:
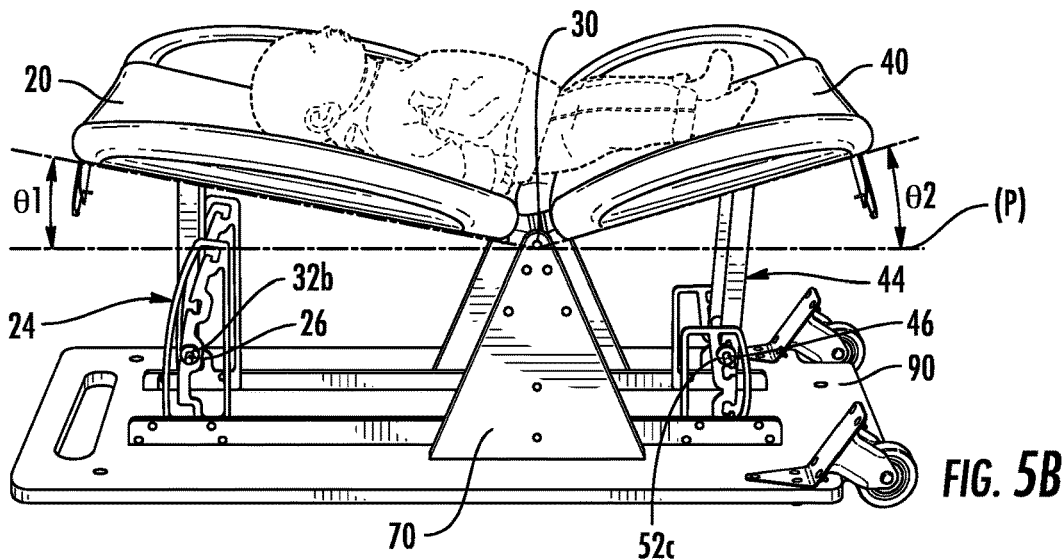
Figure 5C:
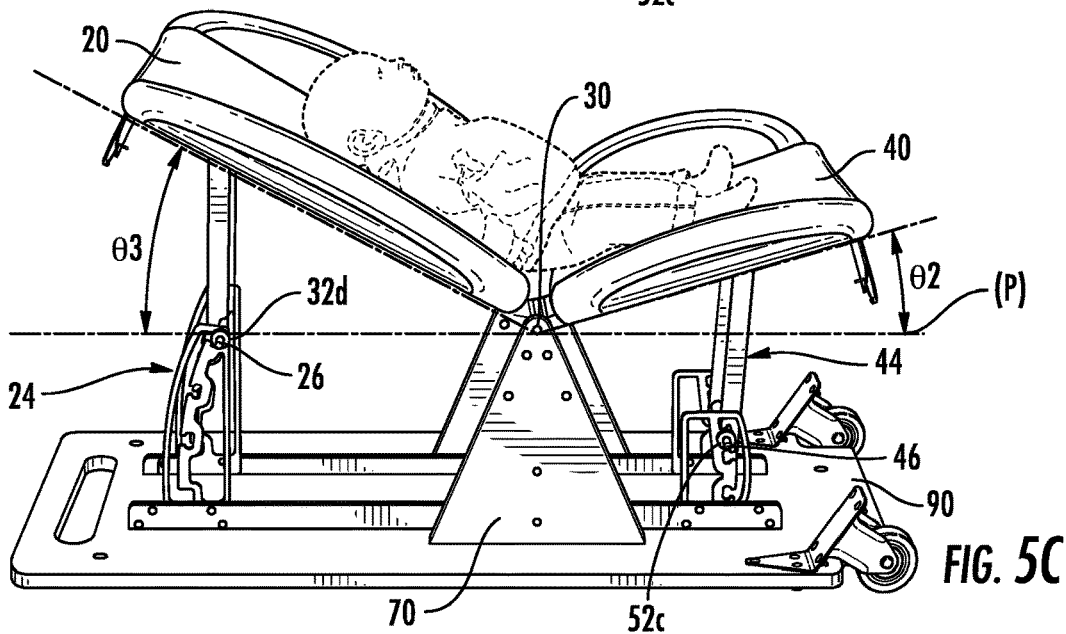

In a preferred embodiment, as shown in FIG. 5A, when the first pin 26 is engaged in the lowermost adjustment opening 32a, the first seat portion 20 is aligned with a horizontal plane (P) such that the first seat portion 20 is neither inclined nor reclined. When the first pin 26 is engaged with a second adjustment opening 32b as shown in FIG. 5B, the first seat portion 20 is angled relative to the horizontal plane (P) extending through the center support 70 by an angle ($\theta 1$), for example, of 8°-12° in one aspect. One of skill in the art will recognize that angle ($\theta 1$) could be less than 8° or greater than 12° within the scope of the subject matter of this disclosure. As shown in FIG. 5C, when the first pin 26 is engaged with an uppermost adjustment opening 32d, the first seat portion 20 is angled relative to the horizontal plane (P) extending through the center support 70 by another angle ($\theta 3$), for example, of 26°-30° in one aspect. One of skill in the art will recognize that angle ($\theta 3$) could be less than 26° or greater than 30°, provided that angle ($\theta 3$) is greater than angle ($\theta 1$), within the scope of the subject matter of this disclosure. In another example, additional or fewer adjustment openings can be provided, and different incline angles can be provided. For example, when the first pin 26 is engaged in the lowermost adjustment opening 32a, the first seat portion 20 could be in a declined position relative to the horizontal plane (P). In another example, when the first pin 26 is engaged in the uppermost adjustment opening 32d, the first seat portion 20 could be positioned at a substantially perpendicular angle to the horizontal plane (P).

The seat assembly 10 can comprise a second adjustment assembly 44 that is configured to adjust an angle of the second seat portion 40 relative to the junction 30. The second adjustment assembly can be configured in any suitable manner to enable adjustment of the angle of the second seat portion 40, and some examples of a second adjustment assembly are discussed below. In one aspect, the second adjustment assembly 44 can comprise a second support 45 connected to the second seat portion 40, a second pin 46 attached to the second support 45, and a second plurality of adjustment openings 52a, 52b, 52c, 52d formed in a second base support 50 that is attached to the base 90. In one aspect, the second support 45 can be a frame structure that is pivotally attached to an underside of the second seat portion 40. The second base support 50 can be a frame structure that is rigidly attached to the frame 80 and/or the base 90. In one aspect, the second base support 50 defines a second enclosed track 53 that constrains movement of the second pin 46 to a second predetermined area. An incline angle of the second seat portion 40 can be adjusted by removing the second pin 46 from a first one of the second plurality of adjustment openings 52a, 52b, 52c, 52d and manually raising or lowering the second pin 46 to a different, second one of the second plurality of adjustment openings 52a, 52b, 52c, 52d. In an alternative example, the second adjustment assembly 44 can be modified such that the second pin 46 is formed with the second base support 50, and the adjustment openings 52a, 52b, 52c, 52d are formed on the second support 45. One of ordinary skill in the art would understand that the second adjustment assembly 44 may include varying types of interfaces or configurations that generally provide incremental or variable adjustment. Such examples of other configurations are generally shown in FIGS. 9A-14B.

In one aspect, the second support 45 can be biased in a generally inboard or inward direction such that the second support 45 generally is urged towards the adjustment openings 52a, 52b, 52c, 52d. A spring or other biasing element can be arranged on an underside of the second seat portion 40 to bias the second support 45.

In one aspect, the second plurality of adjustment openings 52a, 52b, 52c, 52d for the second seat portion 40 provide incline angles of 0°, 8°-12°, 13°-17°, and 18°-22°, respectively. In one aspect, the second plurality of adjustment openings 52a, 52b, 52c, 52d for the second seat portion 40 provide incline angles of 0°, 10°, 15°, and 20°, respectively. One of ordinary skill in the art would recognize based on this disclosure that additional or fewer adjustment openings can be provided, and different incline angles can be provided. One of ordinary skill in the art would recognize based on this disclosure that the seat assembly 10 can be configured such that the second seat portion 40 is adjustable to any intermediate angle (i.e. greater than 0° and less than 30°) relative to the junction 30. For instance, the seat assembly 10 can be configured such that the spacing of the adjustment openings 52a, 52b, 52c, 52d is set at evenly spaced intervals in one example. In another example, the seat assembly 10 can be configured such that the spacing between the adjustment openings 52a, 52b, 52c, 52d is set at varying intervals. Additionally, one of ordinary skill in the art would understand that in another example the second seat portion 40 can be variably adjustable to any angle between a minimum angle (such as 0°) and a maximum angle (such as 30°).

As shown in FIG. 5A, when the second pin 46 is in the first adjustment opening 52a, the second seat portion 40 is aligned with the horizontal plane (P) such that the second seat portion 40 is neither inclined nor reclined. FIGS. 5B and 5C illustrate the second pin 46 engaged with the third adjustment opening 52c, such that the second seat portion 40 is inclined at an angle (θ2) relative to the horizontal plane (P) extending through the center support 70. In one aspect, when the second pin 46 is engaged in the lowermost adjustment opening 52a, the second seat portion 40 could be in a declined position relative to the horizontal plane (P). In another example, when the second pin 46 is engaged in the uppermost adjustment opening 52d, the second seat portion 40 could be positioned at a substantially perpendicular angle relative to the horizontal plane (P).

In one aspect, in a lowermost position of the first adjustment assembly 24 and the second adjustment assembly 44, the first seat portion 20 and the second seat portion 40 lay completely flat relative to each other and are parallel to a ground surface or the base 90. Accordingly, the first and second seat portions 20, 40 can be configured to be adjusted to 0°, which simulates a crib-like environment.

The first and second pins 26, 46 are generally illustrated as bars or rods that are dimensioned to be received within respective adjustment openings 32a, 32b, 32c, 32d, 52a, 52b, 52c, 52d. One of ordinary skill in the art would recognize from the present disclosure that this configuration may be modified. For example, the first and second pins 26, 46 could include spring-loaded locking pins with pull tabs or actuators that are configured to be engaged on a lateral side of the of the respective adjustment assemblies instead of requiring a user to manually grab the pins 26, 46 themselves and move them. Additionally, the first and second plurality of adjustment openings 32a, 32b, 32c, 32d, 52a, 52b, 52c, 52d can each have a profile that is generally configured to ensure retention of the first and second pins 26, 46. For example, the first and second plurality of adjustment openings 32a, 32b, 32c, 32d, 52a, 52b, 52c, 52d may include a lip retention feature, pocket, or have an L-shaped profile that ensures the first and second pins 26, 46 remain secured within the first and second plurality of adjustment openings 32a, 32b, 32c, 32d, 52a, 52b, 52c, 52d and prevent inadvertent dislodging from the adjustment openings 32a, 32b, 32c, 32d, 52a, 52b, 52c, 52d. This specific arrangement is advantageous because it provides a relatively uncomplicated adjustment mechanism that is unlikely to disrupt or disturb the infant occupant of the assembly 10 during adjustment. The arrangement requires slight application of force to move and readjust the pins 26, 46, thus resulting in reduced jostling of the assembly 10 during adjustment and a relatively silent adjustment process.

Figure 6A:
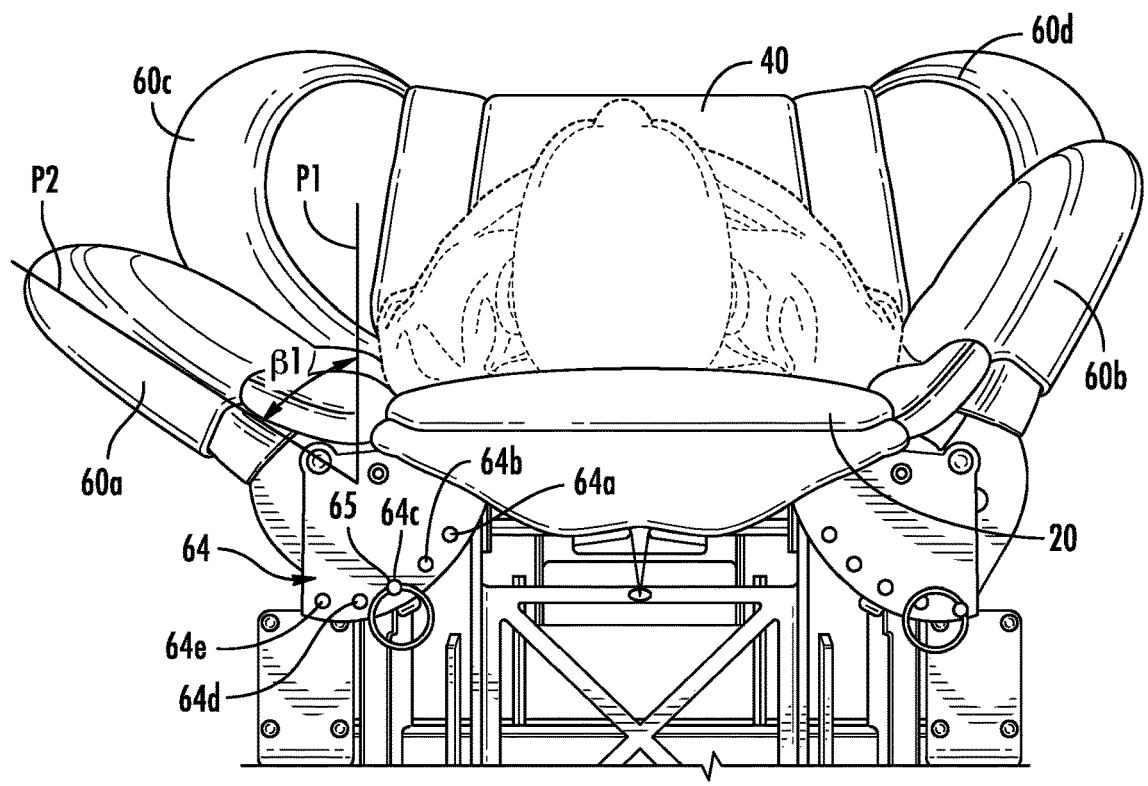
FIGS. 6A and 6B are end views of a third adjustment assembly with side containment panels in two different states and according to one example.
Figure 6B:
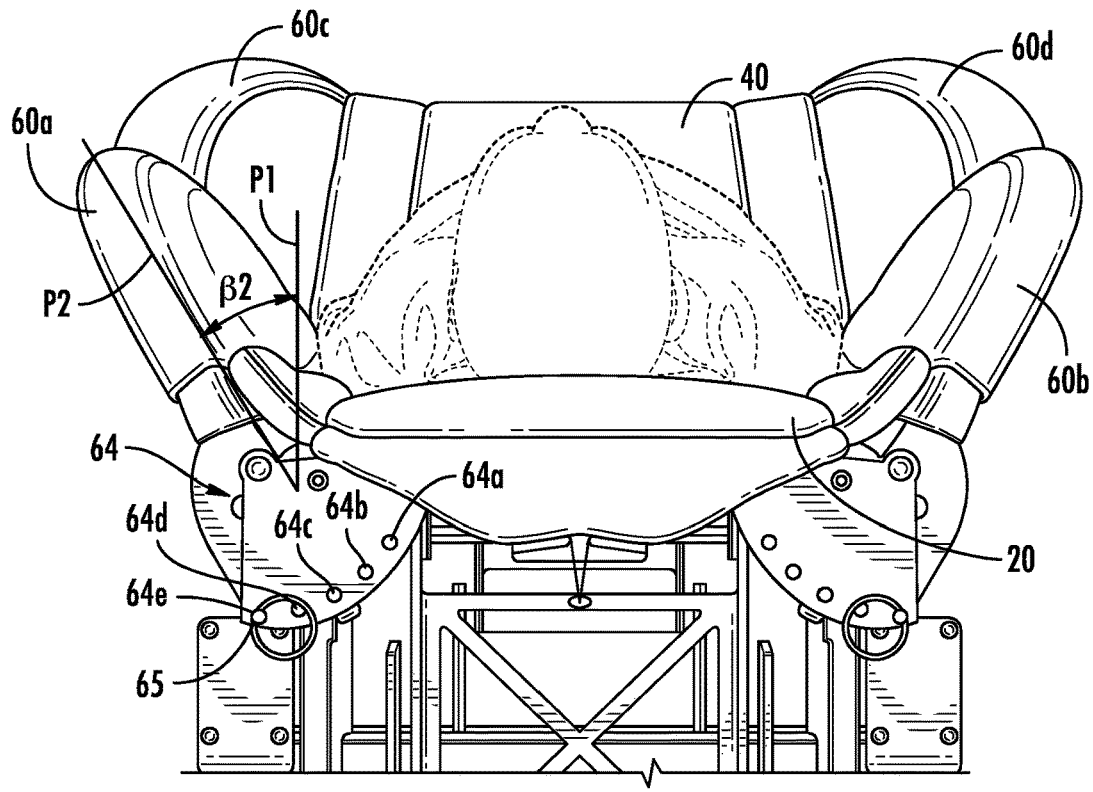

As shown in FIGS. 6A and 6B, the assembly 10 can comprise at least one third adjustment assembly 64 that is configured to adjust an incline angle of the plurality of lateral containment supports 60a, 60b, 60c, 60d relative to a respective one of the first seat portion 20 or the second seat portion 40. It can be advantageous to adjust the lateral containment supports 60a, 60b, 60c, 60d in order to provide improved side restraints for the infant occupant of the assembly 10 and to also allow easier access for a caregiver relative to the infant occupant in situations where side access to the assembly 10 is required (i.e. when the assembly 10 is arranged in a car).

In one aspect, the at least one third adjustment assembly 64 can include four distinct adjustment assemblies, such that an adjustment assembly is provided for each one of the lateral containment supports 60a, 60b, 60c, 60d. The at least one third adjustment assembly 64 may include a pair of first seat portion adjustment assemblies provided on a longitudinal end of the first seat portion 20 and a pair of second seat portion adjustment assemblies provided on a longitudinal end of the second seat portion 40.

In one aspect, each third adjustment assembly 64 can comprise a third plurality of adjustment openings 64a, 64b, 64c, 64d, 64e formed on a support plate mounted to the lateral containment supports 60a, 60b, 60c, 60d or otherwise connected to the lateral containment supports 60a, 60b, 60c, 60d. A third pin 65 is configured to engage with a selected one of the third plurality of adjustment openings 64a, 64b, 64c, 64d, 64e. Each lateral containment supports 60a, 60b, 60c, 60d can be adjusted independently to allow for various lateral angles. For example, a user may adjust the adjustment assemblies associated with the containment supports 60a, 60b to have a steeper incline as compared to the adjustment assemblies associated with the containment supports 60c, 60d, or vice versa. One of ordinary skill in the art would recognize from the present disclosure that other types of adjustment assemblies could be used that can provide different angular adjustment positions, number of adjustment openings, etc. In one aspect, the third pin 65 is a spring-loaded pin with a pull tab that can be manually pulled into and out of engagement with the third plurality of adjustment openings 64a, 64b, 64c, 64d, 64e. In another example, the third pin 65 is a rod or pin. Other types of pins could be used, as one of ordinary skill in the art would appreciate from this disclosure.

As shown in FIGS. 6A and 6B, an adjustment angle is defined between a first plane (P1) (i.e. a reference plane) extending perpendicular from the first seat portion 20 or the second seat portion 40, and a second plane (P2) (i.e. a support plane) defined by a respective one of the lateral containment supports 60a, 60b, 60c, 60d. In FIG. 6A, the third pin 65 is engaged in a third adjustment opening 64c, and the lateral containment support 60a is arranged at an angle (β1). In FIG. 6B, the third pin 65 is engaged in a fifth adjustment opening 64e, and the lateral containment support 60a is arranged at angle (β2), which is smaller than angle (β1). As shown in FIGS. 6A and 6B, the angle (β2) provides a steeper incline and therefore provides improved retention of the infant as compared to the angle (β1). The adjustable infant seat assembly 10 provides the ability for a caregiver to adjust the angle of the lateral containment supports 60a, 60b, 60c, 60d based on the infant's level of mobility. As one of ordinary skill in the art would appreciate, the third adjustment assembly 64 can be configured to provide adjustment using a variety of different arrangements, mechanisms, or configurations. Such examples of other configurations are generally shown in FIGS. 9A-14B.

In one example, the lateral containment supports 60a, 60b, 60c, 60d can be configured to be retractable and extendable such that a length of their extension can become shorter or longer. In another example, the lateral containment supports 60a, 60b, 60c, 60d can be configured to slide inward relative the first and second seat portions 20, 40 such that the lateral containment supports 60a, 60b, 60c, 60d can drop out of the way for easier access to the first and second seat portions 20, 40 from a lateral side.

In one aspect, the first adjustment assembly 24, the second adjustment assembly 44, and the at least one third adjustment assembly 64 are independently adjustable. Adjusting or engaging any one of the adjustment assemblies has no influence or impact on the other adjustment assemblies, in one aspect. In one example, at least one lateral containment support 60a, 60b, 60c, 60d is independently adjustable relative to at least one of the first seat portion 20 or the second seat portion 40. In another example, at least one lateral containment support 60a, 60b, 60c, 60d is independently adjustable relative to another one of the lateral containment supports 60a, 60b, 60c, 60d. In another example, each of the lateral containment supports 60a, 60b, 60c, 60d are independently adjustable relative to one another. In another example, each of the lateral containment supports 60a, 60b, 60c, 60d are independently adjustable relative to at least one of the first seat portion 20 or the second seat portion 40. One of ordinary skill in the art would understand based on this disclosure that various other adjustment configurations could be provided.

In total, the adjustable infant seat assembly 10 can include six adjustment assemblies that are capable of adjusting an angle of one part relative to another. The six adjustment assemblies include: a single first adjustment assembly 24 for the first seat portion 20, a single second adjustment assembly 44 for the second seat portion 40, and four third adjustment assemblies 64 for the lateral containment supports 60a, 60b, 60c, 60d. One of skill in the art will recognize that fewer or more adjustment assemblies can be used within the scope of the subject matter disclosed herein.

Figure 7:
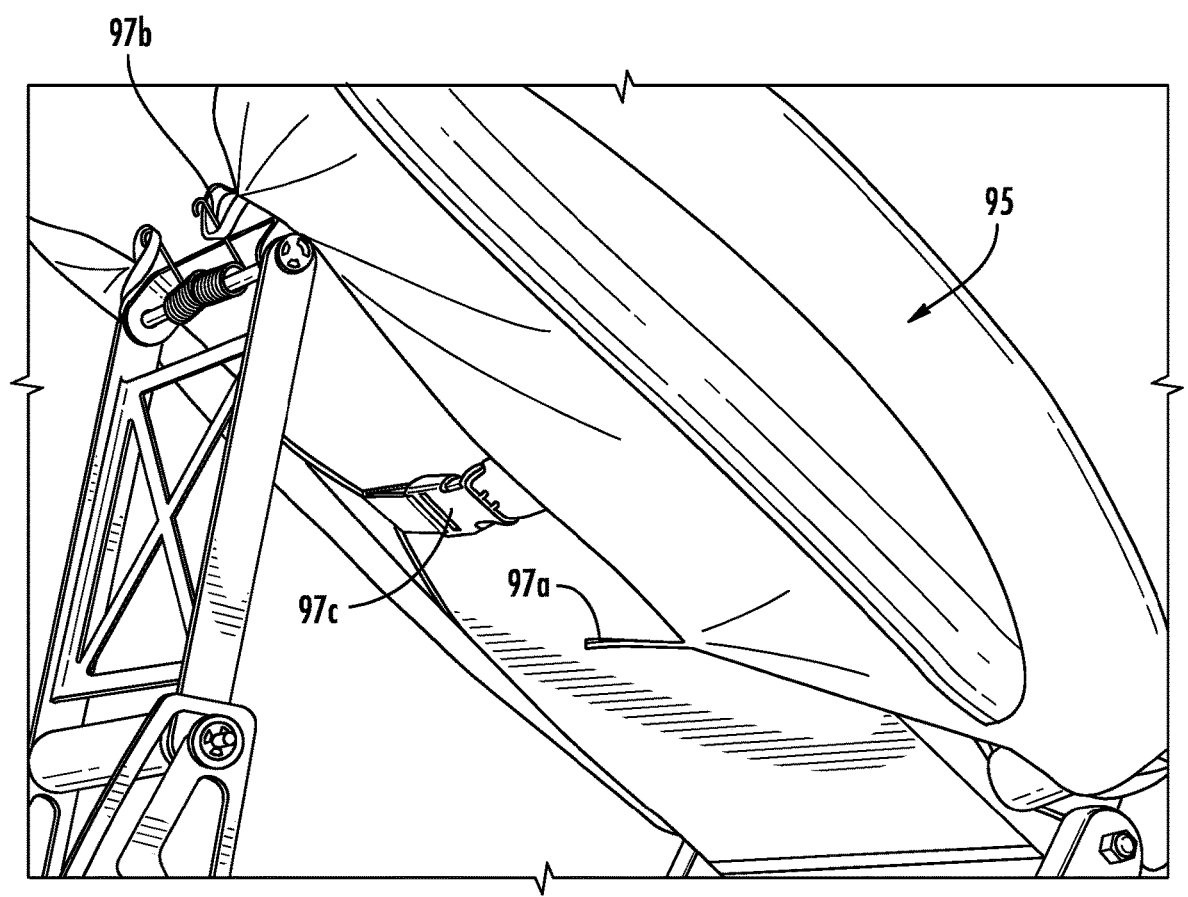
FIG. 7 is a rear view of the adjustable infant seat assembly showing one example of attachment features for a soft goods assembly.
Figure 8:
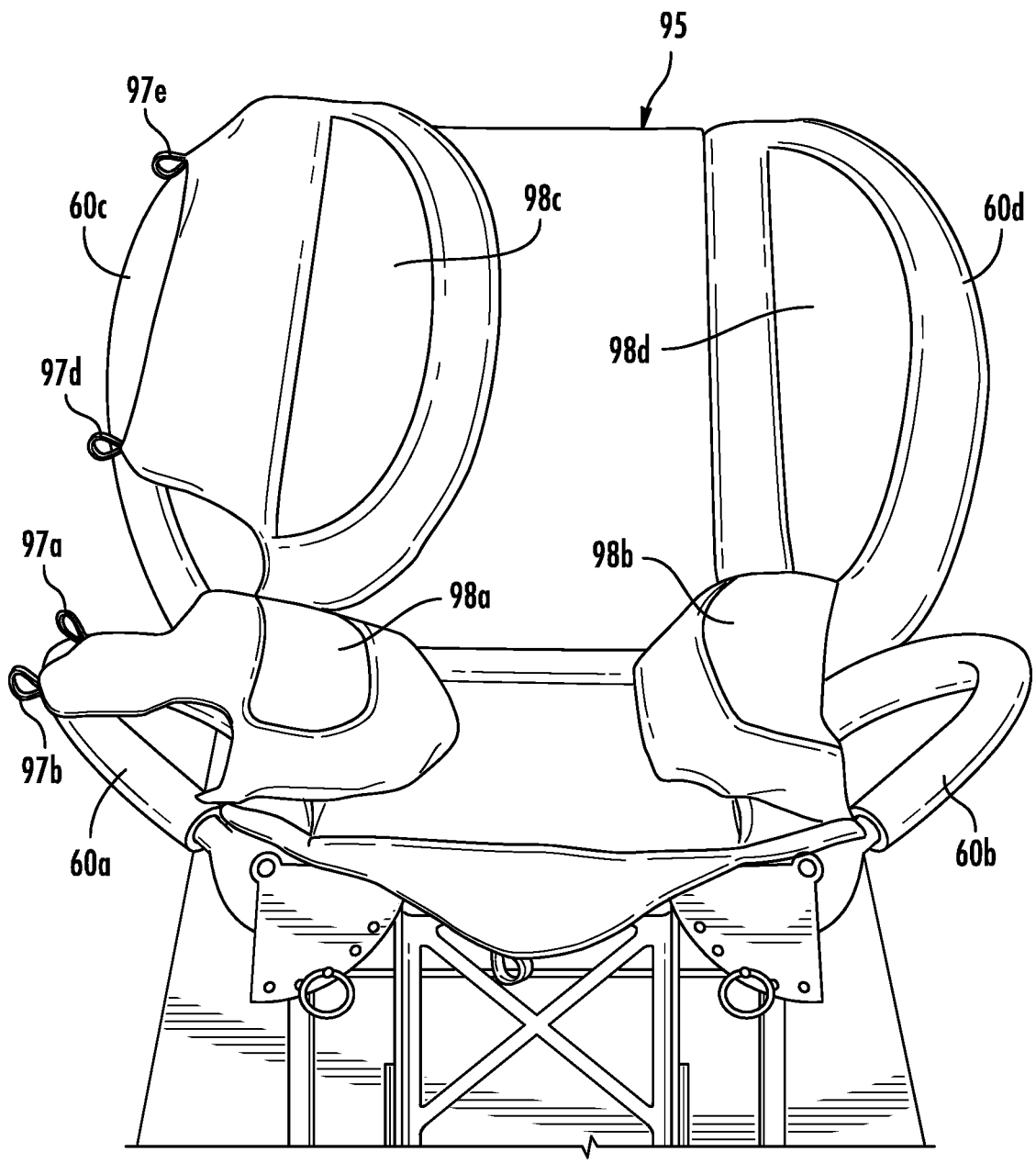
FIG. 8 is another view of the adjustable infant seat assembly with the soft goods assembly in a partially attached state.

A soft goods assembly 95 is also disclosed herein. As shown in FIGS. 7 and 8, the soft goods assembly 95 includes at least one fastener 97a, 97b, 97c, 97d, 97e configured to wrap around at least one portion of the adjustable infant seat assembly 10 to secure the soft goods assembly 95 to the infant seat assembly 10. FIG. 7 specifically shows the engagement of the soft goods assembly 95 with the first seat portion 20 via fasteners 97a, 97b, and 97c. One of ordinary skill in the art would recognize that additional fasteners, such as fasteners 97d and 97e in FIG. 8, are provided for securing the soft goods assembly 95 to the second seat portion 40.

As shown in FIG. 7, one fastener 97b is configured to wrap around a spring leg on an underside of the first seat portion 20. This attachment interface to a spring leg is for illustrative purposes only and one of ordinary skill in the art would understand that various connection points could be provided for the fasteners 97a, 97b, 97c, 97d, 97e. Fastener 97c includes male and female mating parts that are joined together to define a closed loop. In one aspect, the fasteners 97a, 97b, 97c, 97d, 97e include a plurality of hooks, elastic loops, and buckles. The fasteners 97a, 97b, 97c, 97d, 97e are configured to ensure the soft goods assembly 95 is securely tensioned relative to a remainder of the infant seat assembly regardless of the angular orientations. One of ordinary skill in the art would recognize that other embodiments could include different attachment configurations, such as snaps, zippers, buttons, etc.

In one aspect, the soft goods assembly 95 further includes a plurality of enclosures 98a, 98b, 98c, 98d, shown in FIG. 8, which are each configured to surround a respective one of the lateral containment supports 60a, 60b, 60c, 60d. The enclosures 98a, 98b, 98c, 98d can be formed as pockets or sleeves that are dimensioned to tightly wrap around the lateral containment supports 60a, 60b, 60c, 60d. The enclosures 98a, 98b, 98c, 98d can be include cloth coverings and elastic bands for wrapping around the lateral containment supports 60a, 60b, 60c, 60d.

Each portion of the soft goods assembly 95, such as the enclosures 98a, 98b, 98c, 98d, is connected such that the soft goods assembly 95 is provided as one piece. Accordingly, the soft goods assembly 95 can easily be removed for washing and handled during washing. One of ordinary skill in the art would understand that the soft goods assembly 95 could include multiple parts, which can be attachable and detachable from each other.

Figure 9A:
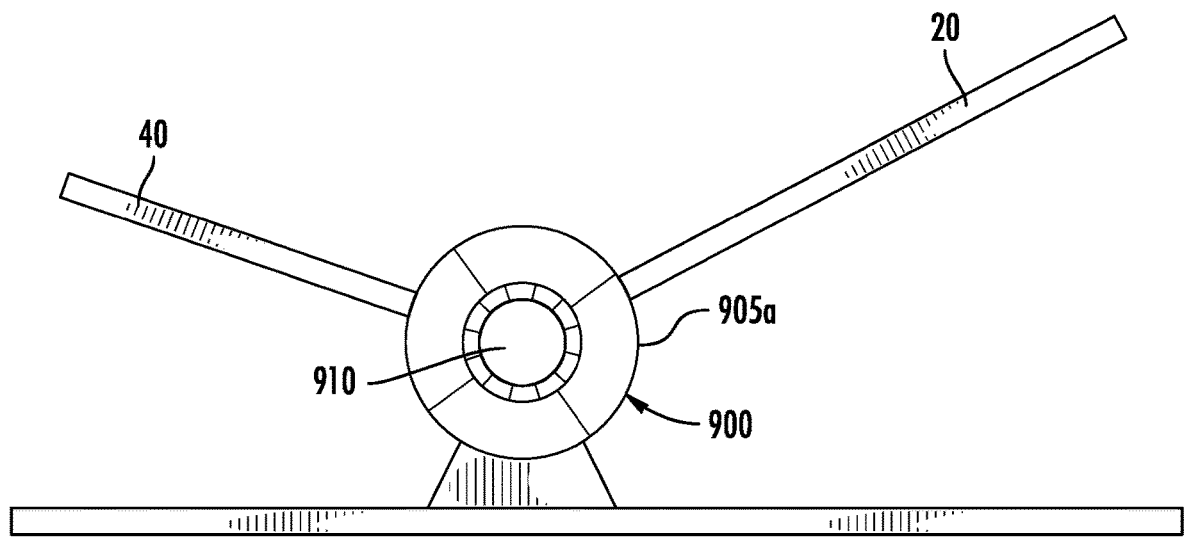
FIG. 9A is a side view of an adjustment assembly including a centrally located actuator.
Figure 9B:
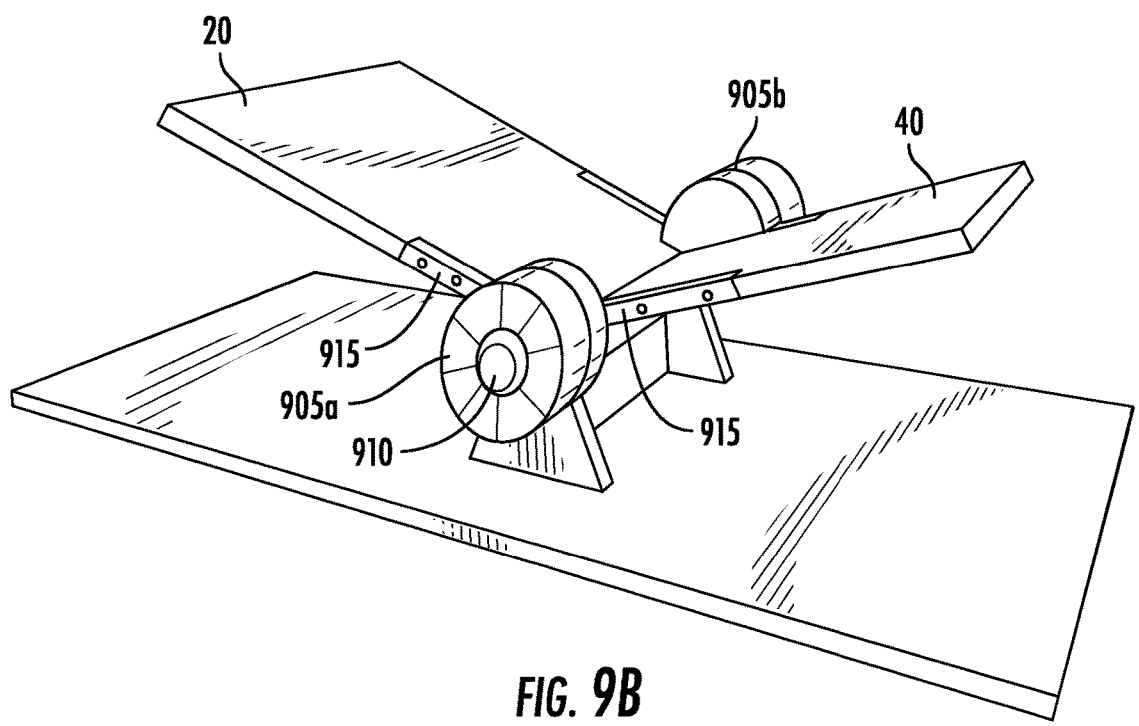
FIG. 9B is a perspective view of the adjustment assembly of FIG. 9A.

FIGS. 9A and 9B illustrate additional aspects for adjusting the first and second seat portions 20, 40 relative to each other. As shown in FIGS. 9A and 9B, a central adjustment assembly 900 is provided that includes at least one hub 905a, 905b, at least one actuator 910, and at least one frame 915. The hubs 905a, 905b generally support the frames 915 which are attached to the first and second seat portions 20, 40. The actuator 910 can be provided as a push button, in one aspect. In another example, the actuator 910 can be provided in various other forms, such as a lever, latch, slider, or other type of actuator structure. In one aspect, the actuator 910 is configured to cause a plate or other type of locking component inside of the hub 905a, 905b to move into and out of a locked position. In one aspect, a first one of the hubs 905a can be configured to unlock and lock the first seat portion 20, and a second one of the hubs 905b can be configured to unlock and lock the second seat portion 40. Therefore, the positions of the first and second seat portions 20, 40 can be independently adjustable relative to each other. The actuators 910 can be configured to be outwardly biased via a biasing element, such as a spring. The actuators 910 can generally be provided in a central region relative to the first and second seat portions 20, 40. In another example, the actuators 910 could be positioned on an underside of the first and second seat portions 20, 40. As shown in FIGS. 9A and 9B, the first and second seat portions 20, 40 essentially extend cantilevered from the central adjustment assembly 900.

Figure 10A:
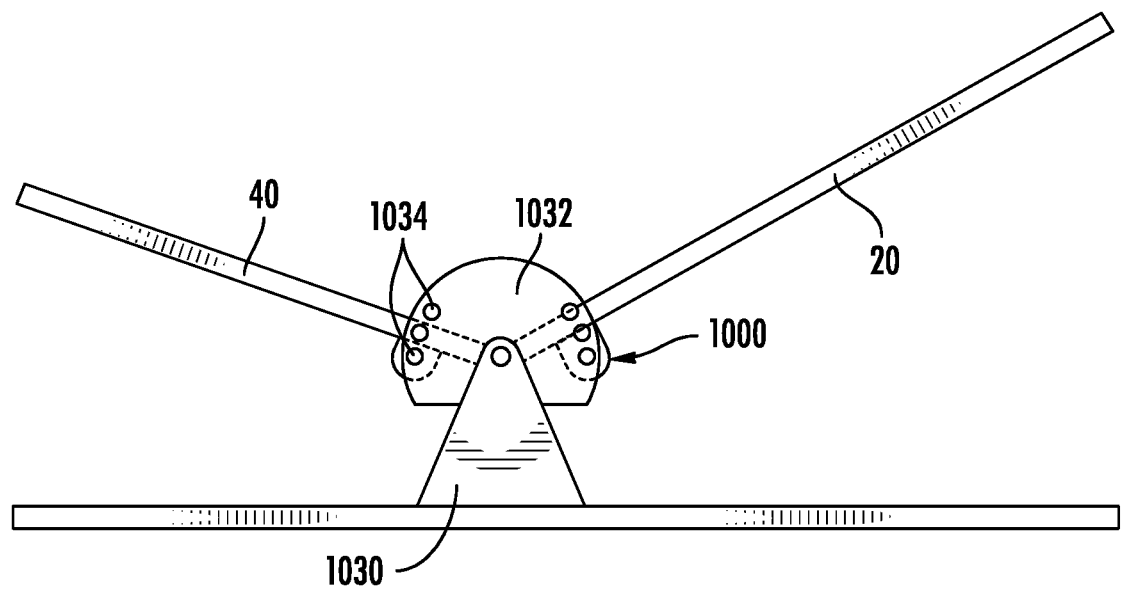
FIG. 10A is a side view of an adjustment assembly including removable locking elements.
Figure 10B:
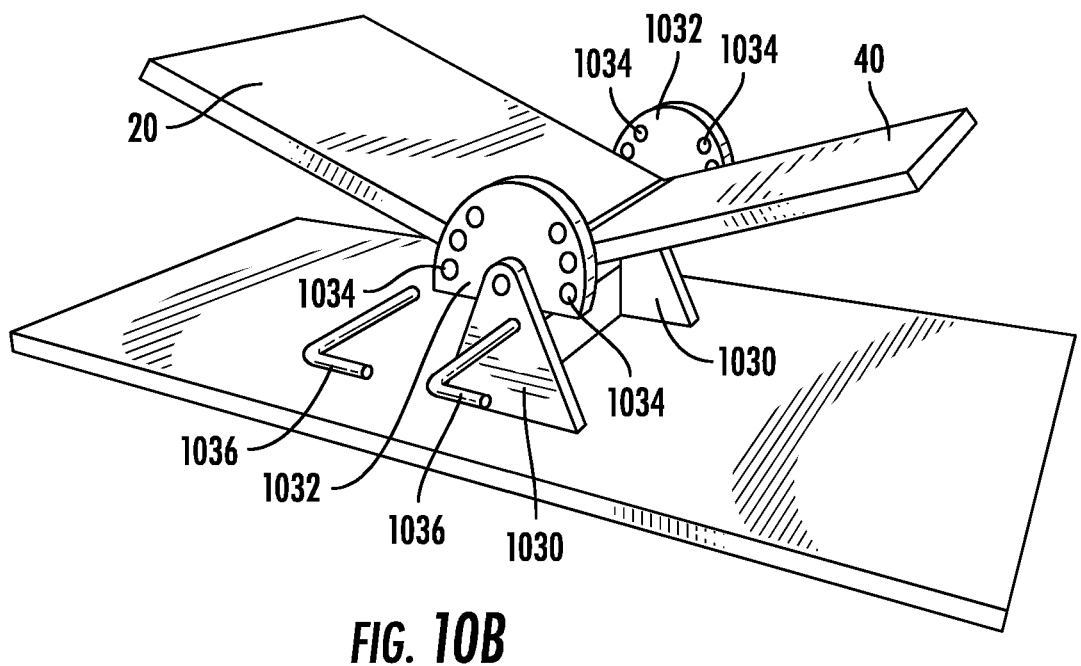
FIG. 10B is a perspective view of the adjustment assembly of FIG. 10A.

FIGS. 10A and 10B illustrate another aspect for adjusting the relative positions of the first and second seat portions 20, 40. As shown in FIGS. 10A and 10B, an adjustment assembly 1000 is provided that includes a central support 1030 including a plate 1032 defining a plurality of adjustment openings 1034, and a selectively displaceable locking element 1036. The central support 1030 can be provided on either lateral side of the first and second seat portions 20, 40. Each central support 1030 can include a respective plate 1032 defining a set of the adjustment openings 1034. In total, four locking elements 1036 can be provided. Each of the openings 1034 corresponds to a respective desired angle for the first and second seat portions 20, 40. A user can manually insert and remove the locking elements 1036 relative to the openings 1034 in order to manually adjust and set the relative angle of the first and second seat portions 20, 40. In one aspect, the locking element 1036 is a pin with an angled portion, i.e. L-shaped pin. The locking element 1036 can be provided in various other forms as one of ordinary skill in the art would appreciate from this disclosure. The locking element 1036 can engage with a corresponding lateral opening defined in the first and second seat portions 20, 40 to hold the first and second seat portions 20, 40 in place. In another aspect, the locking element 1036 can engage underneath the first and second seat portions 20, 40 to hold the first and second seat portions 20, 40 in place.

Figure 11A:
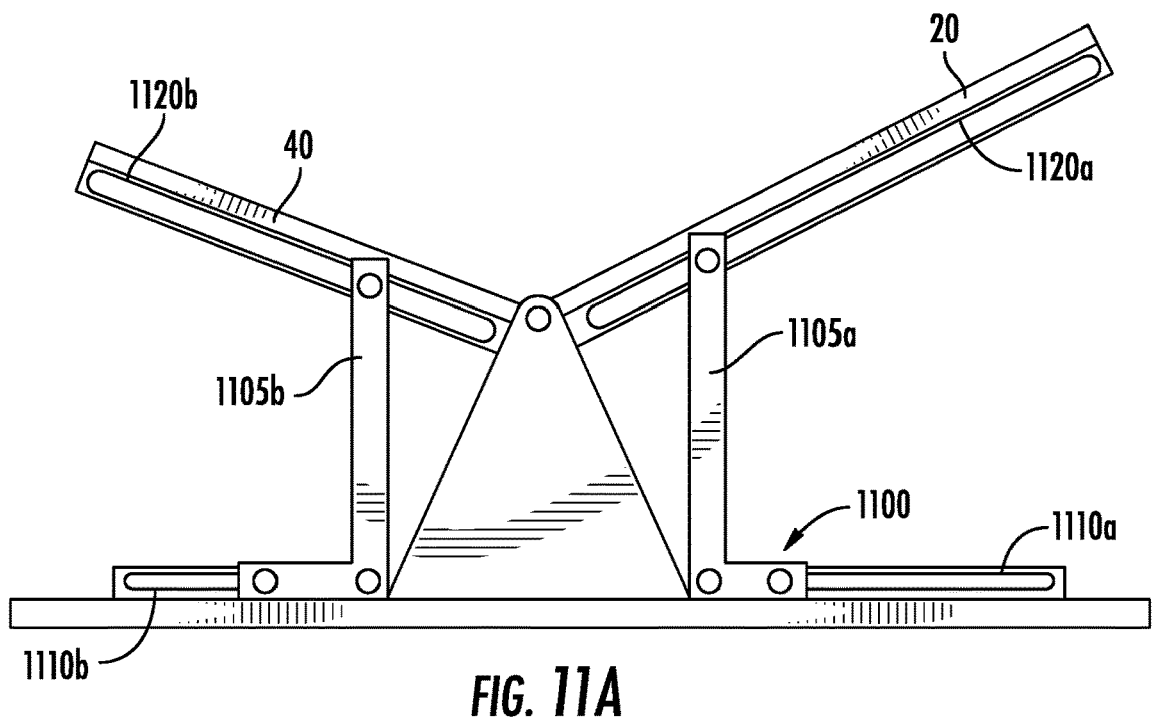
FIG. 11A is a side view of an adjustment assembly including slidable frames and associated tracks.
Figure 11B:
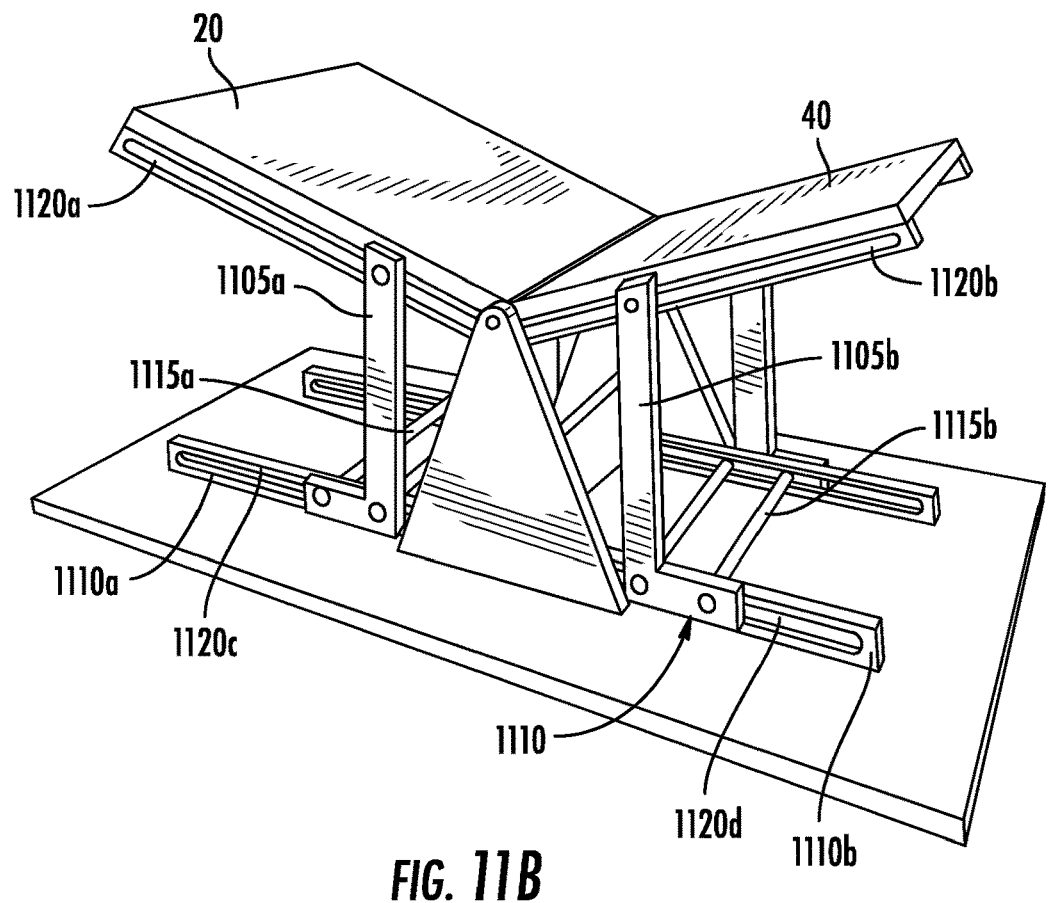
FIG. 11B is a perspective view of the adjustment assembly of FIG. 11A.

FIGS. 11A and 11B illustrate another aspect for an adjustment assembly 1100 that is configured to adjust the relative positions of the first and second seat portions 20, 40. As shown in FIGS. 11A and 11B, an adjustment frame 1105a, 1105b is provided that has a first end connected to a respective one of the first and second seat portions 20, 40, and a second end connected to a base frame 1110a, 1110b. Tracks 1120a, 1120b are defined on the first and second seat portions 20, 40 and tracks 1120c, 1120d are defined on the base frames 1110a, 1110b that are configured to allow the adjustment frames 1105a, 1105b to slide inward or outward. Based on the rigid construction of the adjustment frames 1105a, 1105b, this inward and outward movement adjusts an angle of the first and second seat portions 20, 40. In one aspect, the adjustment frames 1105a, 1105b have an L-shaped profile. One of ordinary skill in the art would understand that the shape and profile of the adjustment frames 1105a, 1105b can vary. Handles 1115a, 1115b can be provided in an area of the base and can be configured to be gripped by a user to slide the adjustment frames 1105a, 1105b inward and outward. Based on this configuration, when the adjustment frames 1105a, 1105b slide inward, then the first and second seat portions 20, 40 generally become more inclined. As the adjustment frames 1105a, 1105b slide outward, then the first and second seat portions 20, 40 generally become less inclined. Locking assemblies or elements can be provided to secure the adjustment frames 1105a, 1105b and/or handles 1115a, 1115b to ensure that the first and second seat portions 20, 40 remain in a fixed position after adjustment.

Figure 12A:
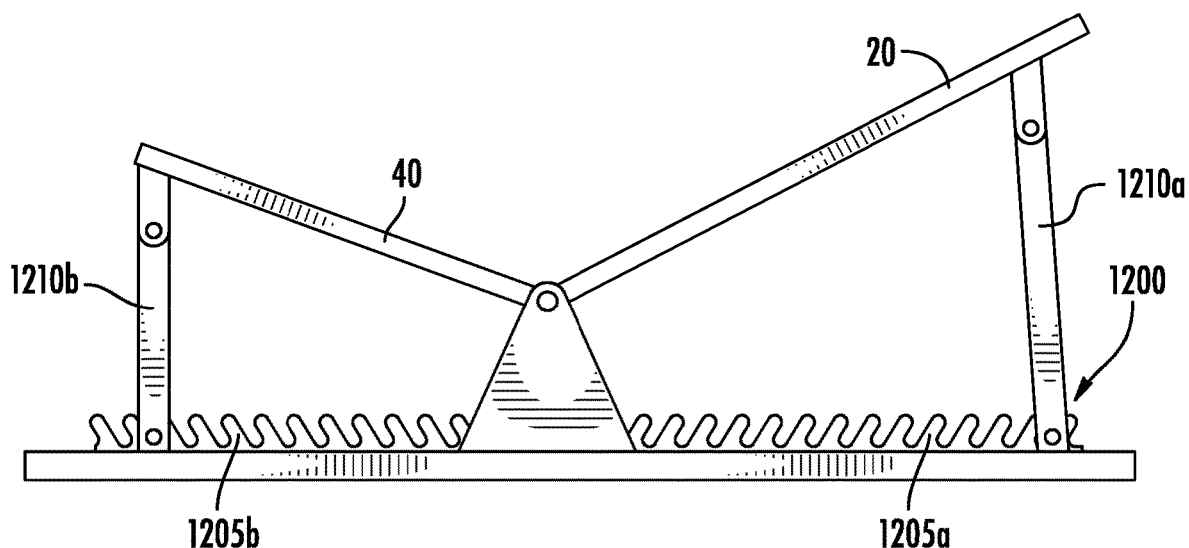
FIG. 12A is a side view of an adjustment assembly including brackets defining grooves and associated handles.
Figure 12B:
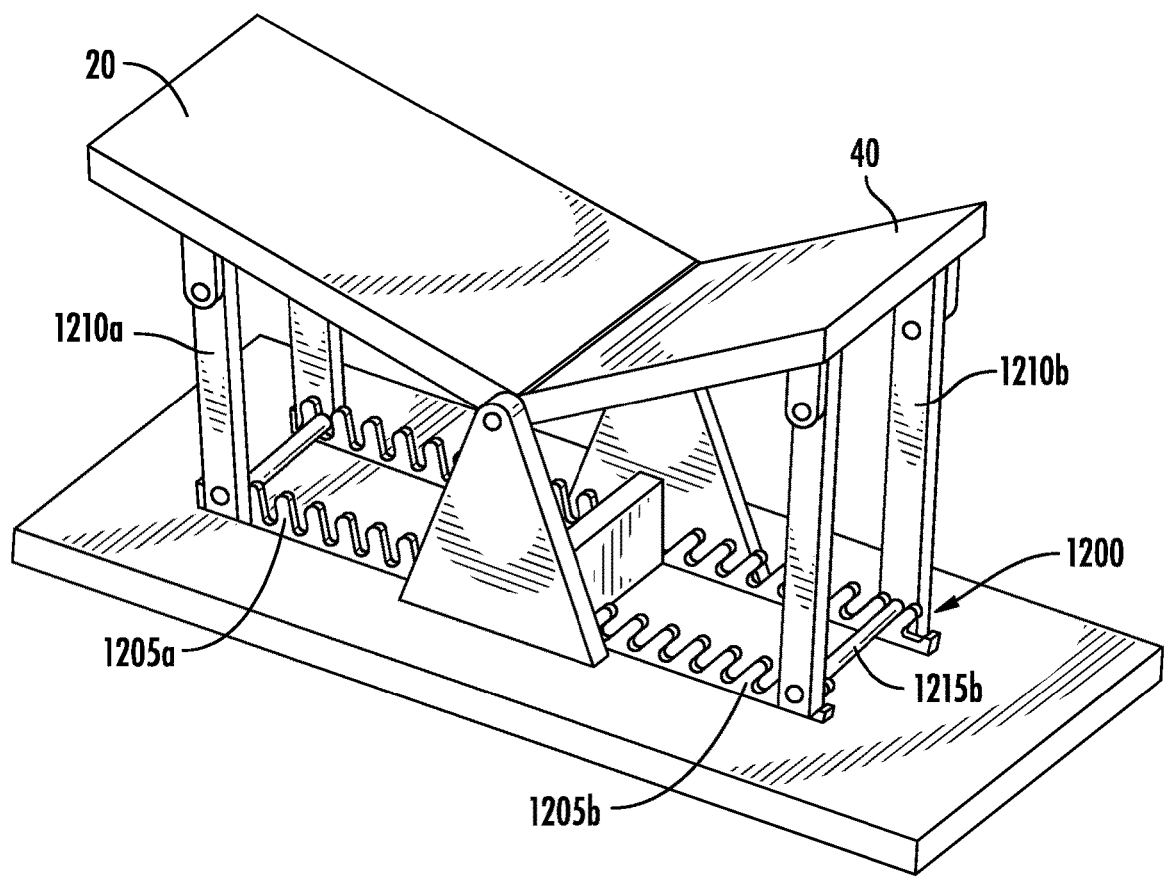
FIG. 12B is a perspective view of the adjustment assembly of FIG. 12A.

FIGS. 12A and 12B illustrate another aspect for an adjustment assembly 1200 that is configured to adjust the relative positions of the first and second seat portions 20, 40. As shown in FIGS. 12A and 12B, brackets 1205a, 1205b are provided that define a plurality of grooves or slots. The grooves or slots can have a generally slanted vertical orientation, in one aspect. Frames 1210a, 1210b attached to the first and second seat portions 20, 40 can each include a crossbar or handle 1215a, 1215b that is dimensioned to be received within the slots or grooves defined by the brackets 1205a, 1205b. Depending on a relative position of the crossbar or handle 1215a, 1215b in the grooves or slots, an angular position of the first and second seat portions 20, 40 will vary. One of ordinary skill in the art would understand that a reverse configuration could be provided in which the brackets 1205a, 1205b are provided on an underside of the first and second seat portions 20, 40, and the frames 1210a, 1210b are connected to a base.

Figure 13A:
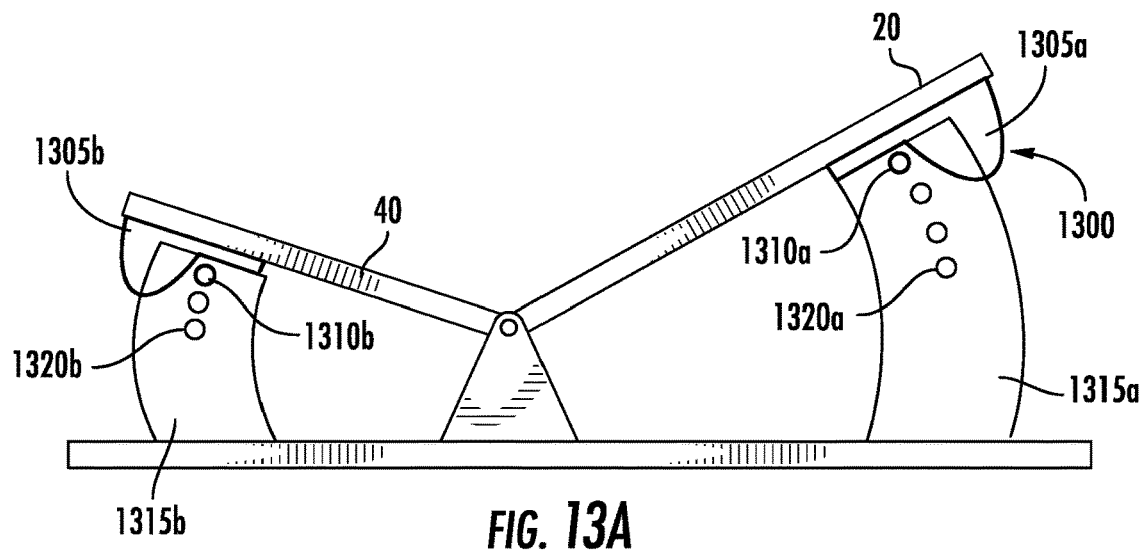
FIG. 13A is a side view of an adjustment assembly including releasable handles or actuators.
Figure 13B:
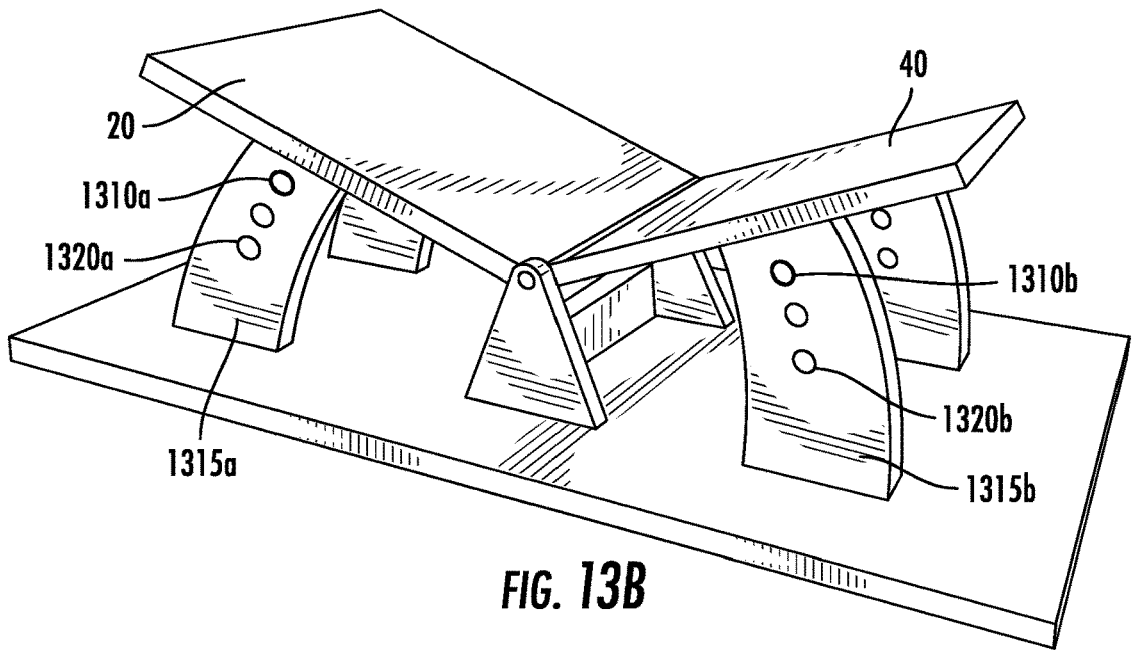
FIG. 13B is a perspective view of the adjustment assembly of FIG. 13A.
Figure 13C:
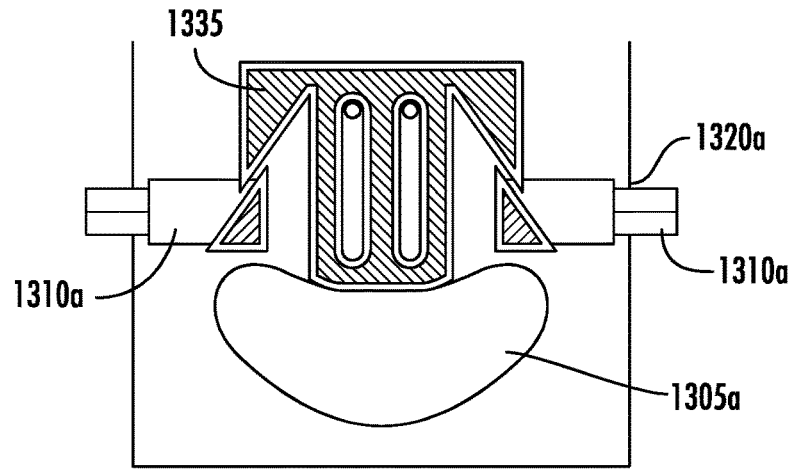
FIG. 13C is a magnified view of the releasable handle or actuator of FIGS. 13A and 13B.

FIGS. 13A-13C illustrate another aspect of an adjustment assembly 1300 for adjusting the relative positions of the first and second seat portions 20, 40. In this configuration, engagement with the handles or actuators 1305a, 1305b can generally be configured to allow for the adjustment of the first and second seat portions 20, 40. Frames 1315a, 1315b can be provided for each of the first and second seat portions 20, 40. The frames 1315a, 1315b each define a plurality of openings 1320a, 1320b that are dimensioned to receive locking members 1310a, 1310b associated with the handles or actuators 1305a, 1305b. In one aspect, the locking members 1310a, 1310b can be plungers, pins, or other types of protrusions. A housing 1335 can be configured to selectively house portions of the locking members 1310a, 1310b. The housing 1335 can include ramped surfaces that are configured to retract or extend the locking members 1310a, 1310b depending on a relative position of the associated handles or actuators 1305a, 1305b. In one aspect, the locking members 1310a, 1310b are spring-biased to a locking position, and pulling the handles or actuators 1305a, 1305b retracts the locking members 1310a, 1310b. One of ordinary skill in the art would understand that the handles or actuators 1305a, 1305b could be formed as buttons, levers, or other types of components configured to be selectively engaged or manipulated by a user.

Figure 14A:
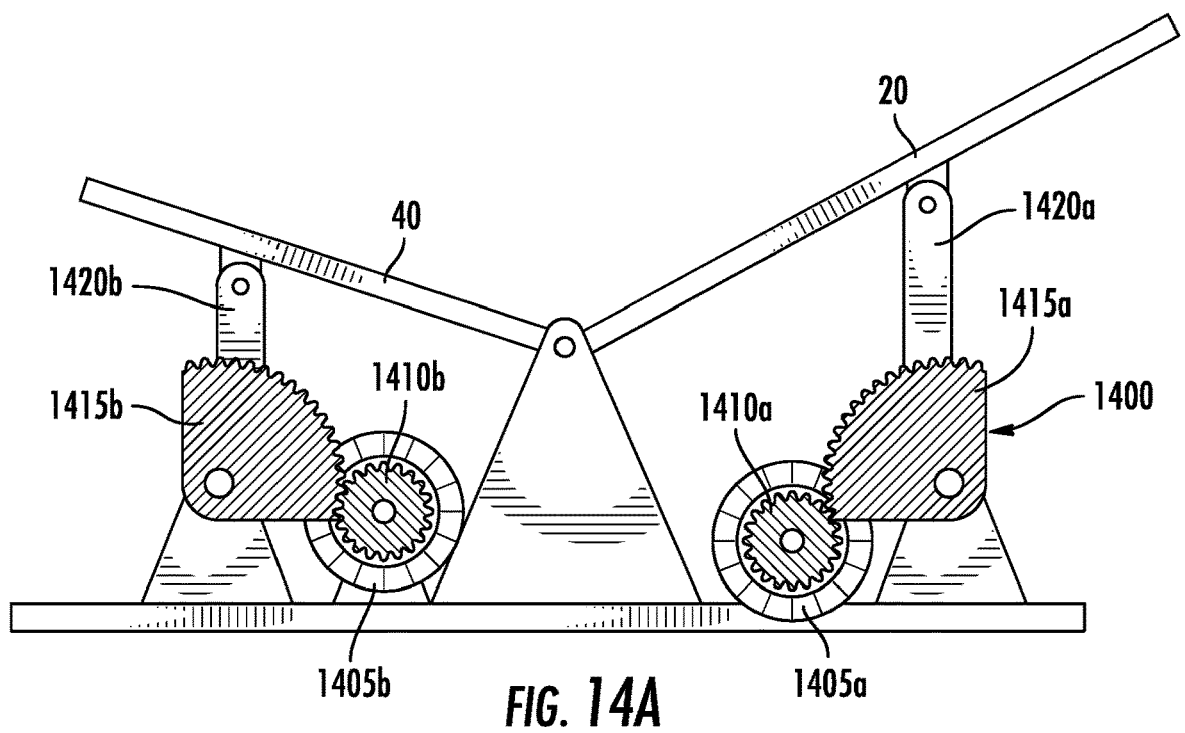
FIG. 14A is a side view of an adjustment assembly including knobs or actuators and gears.
Figure 14B:
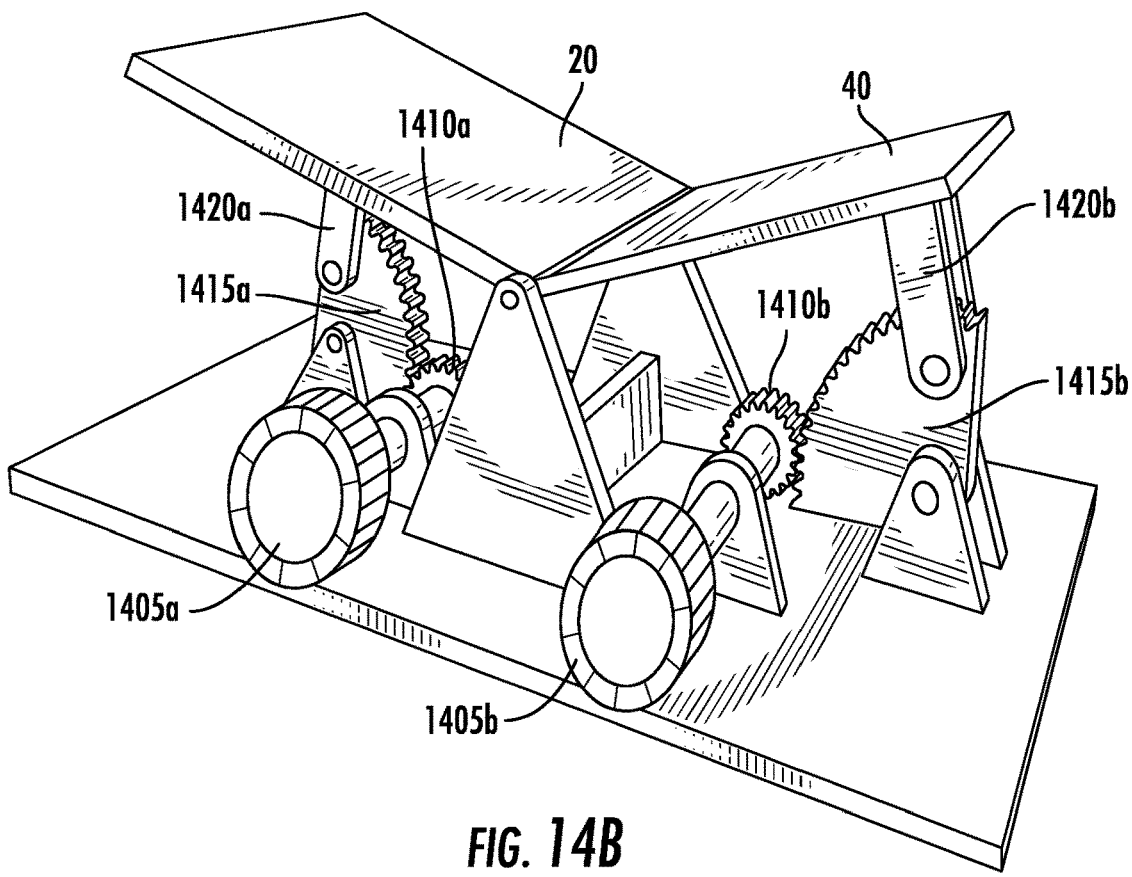
FIG. 14B is a perspective view of the adjustment assembly of FIG. 14A.

FIGS. 14A and 14B illustrate another aspect of an adjustment assembly 1400. In FIGS. 14A and 14B a series of knobs and gears can be used to selectively adjust the relative angular positions of the first and second seat portions 20, 40. As shown in FIGS. 14A and 14B, knobs or actuators 1405a, 1405b can be provided for selectively adjusting the angular positions of the first and second seat portions 20, 40. The knobs or actuators 1405*a*, 1405*b* are each connected to a pin or axle with an associated gear 1410*a*, 1410*b*, which is configured to mesh or engage with another gear 1415*a*, 1415*b*. The gears 1415*a*, 1415*b* are each connected to a respective frame member 1420*a*, 1420*b*, which is attached to either the first or second seat portion 20, 40. A locking mechanism can be provided integrally with the knobs or actuators 1405*a*, 1405*b* such that the knobs or actuators 1405*a*, 1405*b* can be secured in one position. In one aspect, the knobs or actuators 1405*a*, 1405*b* are spring-biased into a keyed support, in which the knobs or actuators 1405*a*, 1405*b* must first be pulled outward in order to allow for their rotation. Other types of locking arrangements could be used.

FIGS. 9A-14B do not show the lateral containment supports 60*a*, 60*b*, 60*c*, 60*d* only for illustrative purposes. One of ordinary skill in the art would understand that the lateral containment supports 60*a*, 60*b*, 60*c*, 60*d* can be used in any one of the configurations shown in FIGS. 9A-14B. Additionally, any one of the configurations shown in FIGS. 9A-14B can be used to adjust a relative position of the lateral containment supports 60*a*, 60*b*, 60*c*, 60*d*.

While some configurations disclosed herein have predetermined angular positions that correspond to a predetermined range of angles, one of ordinary skill in the art would understand that other adjustment assemblies may be used that are completely variable. For example, adjustment assemblies including straps that have adjustable lengths or dimensions may be used to allow the first and second seat portions 20, 40 to be adjusted to any angular value. In another example, a hydraulic support can be provided with a completely variable adjustable length and locking element such that the first and second seat portions 20, 40 can be adjusted to any angular value. Other variable length or angular adjustment assemblies could be used.

The infant seat assembly 10 is designed specifically to support an infant, rather than a larger child or adult. For example, the infant seat assembly 10 can be designed to support an infant having a weight of up to 32 lb. and a height of up to 38", and in at least some such examples, the infant seat can be designed to not support a child that is over a weight of 32 lb. and/or a height of 38". In some examples, the infant seat assembly 10 can be designed to support an infant having a size up to the 100th percentile of weight and/or height for a 9-month-old, and in some such examples, the infant seat assembly 10 can be designed to not support a child having a size greater than the 100th percentile of weight and/or height for a 9-month-old. In some examples, the infant seat assembly 10 can be designed to support an infant that weighs up to 30 pounds and/or that is up to 35 inches tall, and in some examples, the infant seat is designed to not support a child that is greater than 30 pounds and/or 35 inches tall.

Various examples of manual adjustment assemblies are disclosed herein that permit a caregiver to manually adjust one or more of the first seat portion 20, second seat portion 40, and/or the lateral containment supports 60*a*, 60*b*, 60*c*, 60*d* by hand. It will be understood that, in alternative examples, the infant seat assembly 10 can comprise at least one automatic adjustment assembly that includes an actuator that is driven by a power source such as (without limitation) an electric actuator, a pneumatic actuator, or a hydraulic actuator, that causes adjustment of one or more of the first seat portion 20, second seat portion 40, and/or the lateral containment supports 60*a*, 60*b*, 60*c*, 60*d*.

Although not specifically illustrated, one of ordinary skill in the art would recognize that additional safety restraint features could be integrated with the adjustable infant seat assembly 10, such as a seat belt or harness type restraint.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

The invention claimed is:

1. An adjustable infant seat assembly comprising:
    a first seat portion configured to support an infant's upper body;
    a second seat portion configured to support an infant's lower body;
    a junction defined between the first seat portion and the second seat portion that provides a pivot connection for the first seat portion and the second seat portion; and
    a plurality of lateral containment supports, each lateral containment support being arranged on a respective lateral side of either the first seat portion or the second seat portion;
    wherein an angular orientation is configured to be adjustable (i) between the first seat portion and the second seat portion, and (ii) between at least one of the lateral containment supports and at least one of the first seat portion or the second seat portion, and
    the first seat portion and the second seat portion are independently adjustable relative to one another.

2. The adjustable infant seat assembly according to claim 1, further comprising a first adjustment assembly configured to adjust an angle of the first seat portion relative to the junction.

3. The adjustable infant seat assembly according to claim 2, wherein the first adjustment assembly comprises a first support connected to the first seat portion, a first pin attached to the first support, and a first plurality of adjustment openings defined by a first base support, wherein the first pin is configured to be manually adjusted to engage with a selected one of the first plurality of adjustment openings.

4. The adjustable infant seat assembly according to claim 1, further comprising a second adjustment assembly configured to adjust an angle of the second seat portion relative to the junction.

5. The adjustable infant seat assembly according to claim 4, wherein the second adjustment assembly comprises a second support connected to the second seat portion, a second pin attached to the second support, and a second plurality of adjustment openings defined by a second base support, wherein the second pin is configured to be manually adjusted to engage with a selected one of the second plurality of adjustment openings.

6. The adjustable infant seat assembly according to claim 1, further comprising at least one third adjustment assembly configured to adjust an angle of at least one of the plurality of lateral containment supports relative to a respective one of the first seat portion or the second seat portion.

7. The adjustable infant seat assembly according to claim 6, wherein the at least one third adjustment assembly comprises a third plurality of adjustment openings and a third pin configured to engage with a selected one of the third plurality of adjustment openings.

8. The adjustable infant seat assembly according to claim 1, further comprising:
 a first adjustment assembly configured to adjust an angle of the first seat portion relative to the junction;
 a second adjustment assembly configured to adjust an angle of the second seat portion relative to the junction; and
 a plurality of third adjustment assemblies, each one of the third adjustment assemblies being configured to adjust an angle of the plurality of lateral containment supports relative to a respective one of the first seat portion or the second seat portion.

9. The adjustable infant seat assembly according to claim 8, wherein the first adjustment assembly, the second adjustment assembly, and the plurality of third adjustment assemblies are independently adjustable.

10. The adjustable infant seat assembly according to claim 1, wherein at least one lateral containment support of the plurality of lateral containment supports is independently adjustable relative to at least one of the first seat portion or the second seat portion.

11. The adjustable infant seat assembly according to claim 1, wherein at least one lateral containment support of the plurality of lateral containment supports is independently adjustable relative to another one of the lateral containment supports.

12. The adjustable infant seat assembly according to claim 1, wherein each of the plurality of lateral containment supports are independently adjustable relative to one another.

13. The adjustable infant seat assembly according to claim 1, wherein each of the plurality of lateral containment supports are independently adjustable relative to at least one of the first seat portion or the second seat portion.

14. The adjustable infant seat assembly according to claim 1, wherein the first seat portion and the second seat portion are configured to be adjustable such that the first seat portion and the second seat portion lay completely flat relative to each other and are parallel to a ground surface.

15. The adjustable infant seat assembly according to claim 1, further comprising a soft goods assembly including at least one fastener configured to wrap around a portion of the adjustable infant seat assembly to secure the soft goods assembly to the adjustable infant seat assembly.

16. The adjustable infant seat assembly according to claim 15, wherein the soft goods assembly further comprises a plurality of enclosures each configured to surround a selected one of a plurality of lateral containment supports.

17. The adjustable infant seat assembly according to claim 1, wherein a center support is configured to support the junction, and the center support is rigidly secured to a base.

18. The adjustable infant seat assembly according to claim 1, further comprising:
 a first adjustment assembly configured to adjust an angle of the first seat portion relative to the junction, and a second adjustment assembly configured to adjust an angle of the second seat portion relative to the junction, wherein the first adjustment assembly and the second adjustment assembly each include at least one set of gears and at least one actuator that are configured to selectively adjust the relative angles of the first seat portion and the second seat portion.

19. The adjustable infant seat assembly according to claim 1, further comprising:
 a first adjustment assembly configured to adjust an angle of the first seat portion relative to the junction, and a second adjustment assembly configured to adjust an angle of the second seat portion relative to the junction, wherein the first adjustment assembly and the second adjustment assembly each comprise a frame including a plurality of openings corresponding to angular positions of the first seat portion and the second seat portion, and an actuator configured to selectively engage or disengage a locking member from a respective one of the plurality of openings.

20. The adjustable infant seat assembly according to claim 1, further comprising:
 an adjustment assembly arranged in a central region of the adjustable infant seat assembly, the adjustment assembly comprising a first hub configured to adjust an angle of the first seat portion relative to the junction, and a second hub configured to adjust an angle of the second seat portion relative to the junction.

21. A method for adjusting an angular orientation of at least one portion of an infant seat, the method comprising:
 providing an adjustable infant seat assembly including:
  a first seat portion, a second seat portion, and a junction defined between the first seat portion and the second seat portion, the junction providing a pivot connection for both the first seat portion and the second seat portion;
  a plurality of lateral containment supports, each lateral containment support being arranged on a respective lateral side of either the first seat portion or the second seat portion;
  a first adjustment assembly configured to adjust an angle of the first seat portion relative to the junction;
  a second adjustment assembly configured to adjust an angle of the second seat portion relative to the junction; and
  at least one third adjustment assembly configured to adjust an angle of the plurality of lateral containment supports relative to a respective one of the first seat portion or the second seat portion; and
 adjusting a relative position (i) between the first seat portion and the second seat portion via engagement with at least one of the first adjustment assembly or the second adjustment assembly, or (ii) between at least one of the lateral containment supports and at least one of the first seat portion or the second seat portion via engagement with the at least one third adjustment assembly.

22. The method according to claim 21, wherein the at least one third adjustment assembly includes a plurality of third adjustment assemblies, each one of the third adjustment assemblies being provided for a respective one of the plurality of lateral containment supports.

23. The method according to claim 22, wherein the first adjustment assembly, the second adjustment assembly, and the plurality of third adjustment assemblies are independently adjustable.

24. The method according to claim 21, further comprising:
 providing a soft goods assembly including at least one fastener configured to wrap around at least a portion of the adjustable infant seat assembly, and a plurality of enclosures each configured to surround a selected one of the plurality of lateral containment supports.

25. An adjustable infant seat assembly comprising:
a first seat portion configured to support an infant's upper body;
a second seat portion configured to support an infant's lower body; and
a junction defined between the first seat portion and the second seat portion that provides a pivot connection for the first seat portion and the second seat portion;
wherein the first seat portion and the second seat portion are adjustable independent from each other, such that a first angular position of the first seat portion relative to the junction is adjustable without adjusting the second seat portion, and a second angular position of the second seat portion relative to the junction is adjustable without adjusting the first seat portion.

26. The adjustable infant seat assembly according to claim 25, further comprising:
a first adjustment assembly configured to adjust the first angular position of the first seat portion relative to the junction, and
a second adjustment assembly configured to adjust the second angular position of the second seat portion relative to the junction.

27. The adjustable infant seat assembly according to claim 26, wherein the first adjustment assembly comprises a first support connected to the first seat portion, a first pin attached to the first support, and a first plurality of adjustment openings defined by a first base support, wherein the first pin is configured to be manually adjusted to engage with a selected one of the first plurality of adjustment openings to adjust the first angular position of the first seat portion relative to the junction, and
the second adjustment assembly comprises a second support connected to the second seat portion, a second pin attached to the second support, and a second plurality of adjustment openings defined by a second base support, wherein the second pin is configured to be manually adjusted to engage with a selected one of the second plurality of adjustment openings to adjust the second angular position of the second seat portion relative to the junction.

28. The adjustable infant seat assembly according to claim 26, wherein the first adjustment assembly and the second adjustment assembly each include at least one set of gears and at least one actuator that are configured to selectively adjust the first angular position and the second angular position.

29. The adjustable infant seat assembly according to claim 26, wherein the first adjustment assembly and the second adjustment assembly each comprise a frame including a plurality of openings corresponding to angular positions of the first seat portion and the second seat portion, and an actuator configured to selectively engage or disengage a locking member from a respective one of the plurality of openings.

30. The adjustable infant seat assembly according to claim 25, further comprising:
an adjustment assembly arranged in a central region of the adjustable infant seat assembly, the adjustment assembly comprising a first hub configured to adjust the first angular position, and a second hub configured to adjust the second angular position.

31. The adjustable infant seat assembly according to claim 25, wherein the first seat portion and the second seat portion are each configured to lay completely flat relative to each other and are parallel to a ground surface.

32. An adjustable infant seat assembly comprising:
a first seat portion configured to support an infant's upper body;
a second seat portion configured to support an infant's lower body;
a junction defined between the first seat portion and the second seat portion that provides a pivot connection for the first seat portion and the second seat portion;
an adjustment assembly configured to adjust an angle of the second seat portion relative to the junction;
a plurality of lateral containment supports, each lateral containment support being arranged on a respective lateral side of either the first seat portion or the second seat portion;
wherein an angular orientation is configured to be adjustable (i) between the first seat portion and the second seat portion, and (ii) between at least one of the lateral containment supports and at least one of the first seat portion or the second seat portion.

33. An adjustable infant seat assembly comprising:
a first seat portion configured to support an infant's upper body;
a second seat portion configured to support an infant's lower body;
a junction defined between the first seat portion and the second seat portion that provides a pivot connection for the first seat portion and the second seat portion;
a center support configured to support the junction, and the center support is rigidly secured to a base; and
a plurality of lateral containment supports, each lateral containment support being arranged on a respective lateral side of either the first seat portion or the second seat portion;
wherein an angular orientation is configured to be adjustable (i) between the first seat portion and the second seat portion, and (ii) between at least one of the lateral containment supports and at least one of the first seat portion or the second seat portion.

* * * * *